(12) United States Patent
Kuenemund

(10) Patent No.: US 11,652,070 B2
(45) Date of Patent: May 16, 2023

(54) INTEGRATED CIRCUIT

(71) Applicant: Infineon Technologies AG, Neubiberg (DE)

(72) Inventor: Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 113 days.

(21) Appl. No.: 17/183,396

(22) Filed: Feb. 24, 2021

(65) Prior Publication Data

US 2021/0280536 A1    Sep. 9, 2021

(30) Foreign Application Priority Data

Mar. 9, 2020   (DE) ..................... 10 2020 106 346.6

(51) Int. Cl.
| | |
|---|---|
| *H01L 23/00* | (2006.01) |
| *H03K 19/094* | (2006.01) |
| *H03K 19/003* | (2006.01) |
| *G06F 21/72* | (2013.01) |

(52) U.S. Cl.
CPC ............ *H01L 23/576* (2013.01); *G06F 21/72* (2013.01); *H03K 19/003* (2013.01); *H03K 19/094* (2013.01)

(58) Field of Classification Search
None
See application file for complete search history.

(56) References Cited

U.S. PATENT DOCUMENTS

| 9,496,872 | B1 | 11/2016 | Kuenemund | |
|---|---|---|---|---|
| 2017/0110418 | A1 | 4/2017 | Kuenemund et al. | |
| 2020/0210628 | A1* | 7/2020 | Karpinskyy | ....... H03K 19/1737 |
| 2020/0395315 | A1* | 12/2020 | Kang | .................... H01L 23/576 |
| 2021/0066216 | A1* | 3/2021 | Kuenemund | ........ H03K 19/003 |
| 2021/0336804 | A1* | 10/2021 | Parhi | ...................... G06F 21/73 |

FOREIGN PATENT DOCUMENTS

DE    102016113128 A1    1/2017

OTHER PUBLICATIONS

German Office Action issued for the DE patent application No. 10 2020 106 346.6, dated Jan. 14, 2021, 10 pages (for informational purpose only).

* cited by examiner

*Primary Examiner* — Jany Richardson
(74) *Attorney, Agent, or Firm* — Viering, Jentschura & Partner mbB

(57) ABSTRACT

According to various embodiments, an integrated circuit is described comprising a plurality of subcircuits having different signal transfer reaction times, a control circuit configured to form two competing paths from the plurality of subcircuits in response to a control signal, an input circuit configured to supply an input signal to the two competing paths and an output circuit configured to generate an output value depending on which of the competing paths has transferred the input signal with shorter reaction time.

15 Claims, 16 Drawing Sheets

INTEGRATED CIRCUIT

CROSS-REFERENCE TO RELATED APPLICATION

This application claims priority to German Patent Application Serial No. 10 2020 106 346.6, which was filed Mar. 9, 2020, and is incorporated herein by reference in its entirety.

TECHNICAL FIELD

The present disclosure relates to integrated circuits.

BACKGROUND

Reverse Engineering (RE) of Integrated Circuits (ICs) is considered one of the most serious threats to semi-conductor industry, since it may be misused by an attacker to steal and/or pirate a circuit design: an attacker who successful reverse engineers an integrated circuit can fabricate and sell a similar, i.e. cloned, circuit, and illegally use, sell or reveal the extracted design.

Therefore, concepts and techniques that thwart reverse engineering of integrated circuits are desirable.

SUMMARY

According to various embodiments, an integrated circuit is provided including a plurality of subcircuits having different signal transfer reaction times, a control circuit configured to form two competing paths from the plurality of subcircuits in response to a control signal, an input circuit configured to supply an input signal to the two competing paths and an output circuit configured to generate an output value depending on which of the competing paths has transferred the input signal with shorter reaction time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
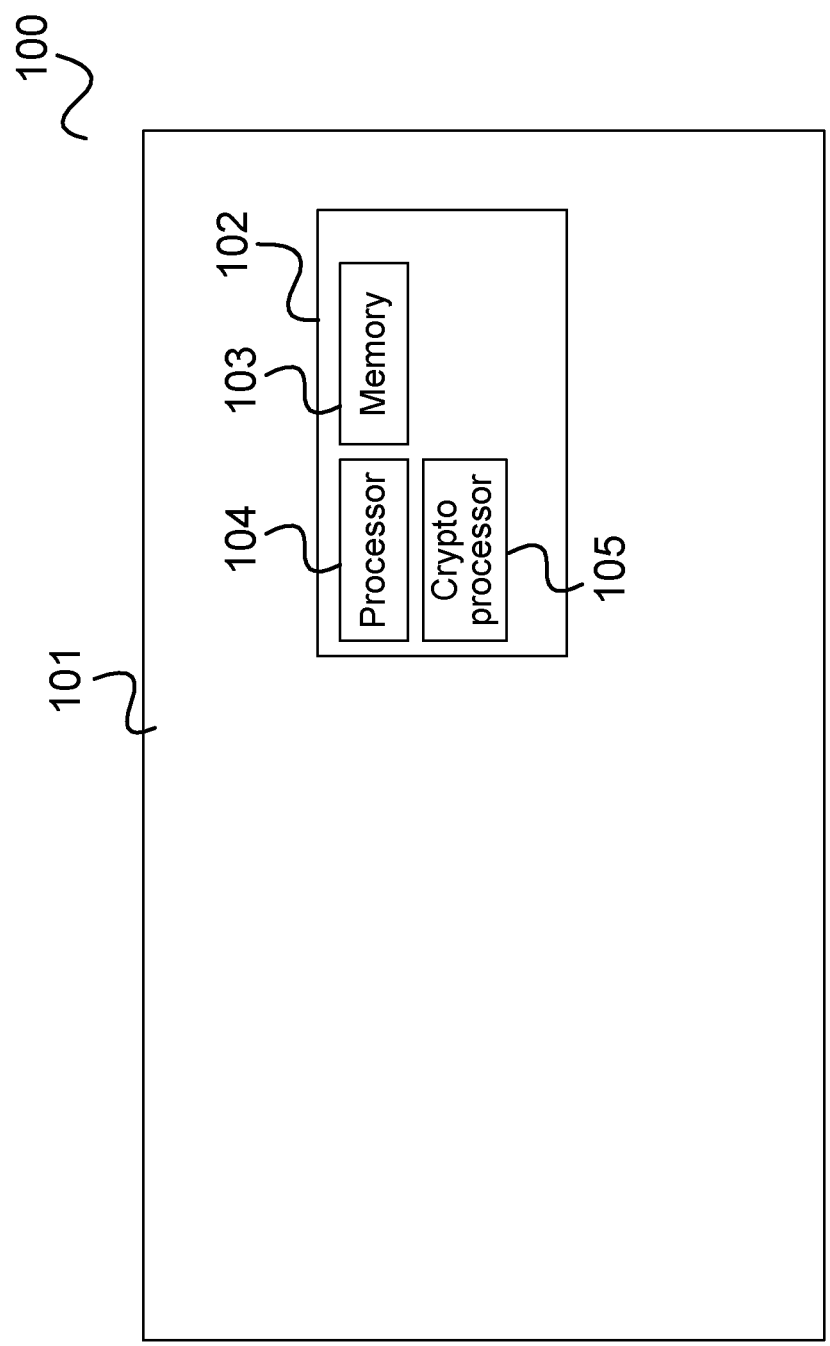
FIG. 1 shows a smart card according to an embodiment.

It is desirable to protect a wide variety of integrated circuits (ICs) from reverse engineering, especially ICs used in security related contexts, such as on a smart card, as shown in FIG. 1.

FIG. 1 shows a smart card 100 according to an embodiment.

The chip card 100 includes a carrier 101 on which a chip card module 102 is placed. The chip card module 102 includes various data processing components, such as a memory 103, a processor 104 and, for example, a dedicated crypto processor 105.

For example, the chip card module 102 is to be protected against reverse engineering. However, this is only intended as an example and ICs in many different applications can be protected against reverse engineering according to various embodiments, e.g. microcontroller ICs, e.g. in control equipment such as in a vehicle, e.g. in an ECU (electronic control unit), for smart cards of any form factor, communication ICs, control ICs of various devices such as printers, etc.

A possibility for protection against reverse engineering is the deployment of camouflage circuits. However, such camouflage circuits may necessitate process technology extensions like doping profile modifications or faked contacts or vias, and/or they entail significantly increased area and energy consumption. Thus, these measures are often too expensive for mass products.

According to various embodiments, for a protection of an integrated circuit against reverse engineering which is efficient (e.g. in terms of area requirement, technology extensions and energy consumption) one or more circuits are provided in the integrated circuit which contain one or more Boolean secrets and output the Boolean secrets in response to a predetermined control input (which may be seen as password required to retrieve the Boolean secret or secrets). A Boolean secret contained in (or represented by) a circuit may be seen as a binary number (of one or more binary digits) which is secret in the sense that it is not apparent from the circuit, e.g. not apparent from the circuit's component types and their connections and not apparent by standard static reverse engineering (e.g. consisting of layer-by-layer analysis, synthesis and reconstruction of the circuit).

Application examples include the Boolean secrets providing secret keys to be used, e.g. by the chip card module 102, for cryptographic algorithms like DES (Data Encryption Standard), AES (Advanced Encryption Standard) or MED (memory encryption/decryption).

According to various embodiments, such secret keys may be password protected, so that these keys may be unlocked in the field at arbitrary points in time in order to enable e.g. de- and encryption of dedicated sectors of NVM (Non Volatile Memory) for code and/data, or to unlock pieces of programmable hardware like FSMs (finite state machines), S-Boxes, LFSRs (linear feedback shift registers) or NLFSRs (nonlinear feedback shift registers). Other possible applications may consist in product diversification, either in the time domain in the sense that a particular customer may get different cryptographically relevant versions of an IC, or in the customer domain in the sense that different customers get different cryptographically relevant versions of an IC at the same or at different points in time. On-chip mutual authentication between different sub-modules may be another possible application.

One implementation example is to extend a circuit having one or more "Indistinguishable yet Complementary Bit-Cells" (ICBC) by adding password protection to the ICBC concept for providing circuitry for the generation of password-protected Boolean secrets.

There are two basic flavors (i.e. variants or incarnations) of an Indistinguishable yet Complementary Bit Cell ICBC-X: ICBC-1 and ICBC-0. Both are electronic circuits, in particular CMOS gates, that respond to an appropriate challenge by outputting a robust logical ONE (ICBC-1) or a robust logical ZERO (ICBC-0) but ICBC-1 and ICBC-0 cannot be distinguished by means of standard reverse engineering (RE) and other analysis methods that may be employed for attacks to Security ICs like chip card modules.

The ICBC-X's indistinguishability is based on a dedicated physical design concept that provides a (sufficiently) symmetric layout of the ICBC-X's active regions, polysilicon or metal gates, contacts, metal wiring etc. On the other hand, the ICBC-X's nMOS and pMOS components (i.e. n-channel MOSFETs (metal oxide semiconductor field effect transistors) and p-channel MOSFETs) have appropriately different threshold voltages (Vth) resulting in the robust transfer characteristics of the ICBC-X when challenged with an input pattern that would otherwise cause the circuit to enter a metastable state.

Since available process options like "low and regular Vth" as well as "regular and high Vth" can be used to realize the ICBC-X concept, no process change is required at all, provided a mixed-Vth scenario for the Security IC under consideration can be assumed.

ICBC-1 and ICBC-0 are Static CMOS gates that can be implemented as (and arbitrarily combined with) elements of standard cell libraries.

Application examples include "Dynamical" TIE-1 and TIE-0 cells, i.e. TIE cells that can be switched between logically valid and invalid states, representing e.g. bits of a secret key or other pieces of confidential information.

Moreover, ICBC-X instances can be combined with standard logic gates to achieve RE-resistant data paths, and ICBC-Xs can be concatenated to realize dynamical TIE tree structures. "Session Key" generation as well as address-dependent memory encryption configuration are also possible. In addition to that, after roll-out, i.e. after the ICBC-X's initial (e.g. random) configuration, the selected configuration can then be stored in NVM for subsequent use in the field. This may even allow for robust and RE-resistant chip-individual pieces of information.

Since a multitude of ICBC-X instances can be distributed irregularly across an IC's entire semi-custom portion, and because these instances can be accessed in irregular, even random, temporal order, the ICBC-X concept tremendously increases the difficulty, risk and effort for all relevant security IC attack scenarios like reverse engineering, photon emission, laser voltage probing, etc.

The basic ICBC-X concept rests upon resolving conventionally metastable states or metastable state transitions of (bi-stable) feedback circuitry by deploying (MOS) transistors (in general switches) with different threshold voltages (in general state transition characteristics) in order to achieve robust ICBC-X state transitions, whereupon the nature of any given ICBC-X instance (i.e. whether X=1 or X=0) remains concealed for an attacker employing relevant security IC attack scenarios like reverse engineering, photon emission, laser voltage probing, etc.

An ICBC-X may for example be formed using NAND or NOR gates, i.e. one specific type of basic Boolean Functions.

Figure 2:
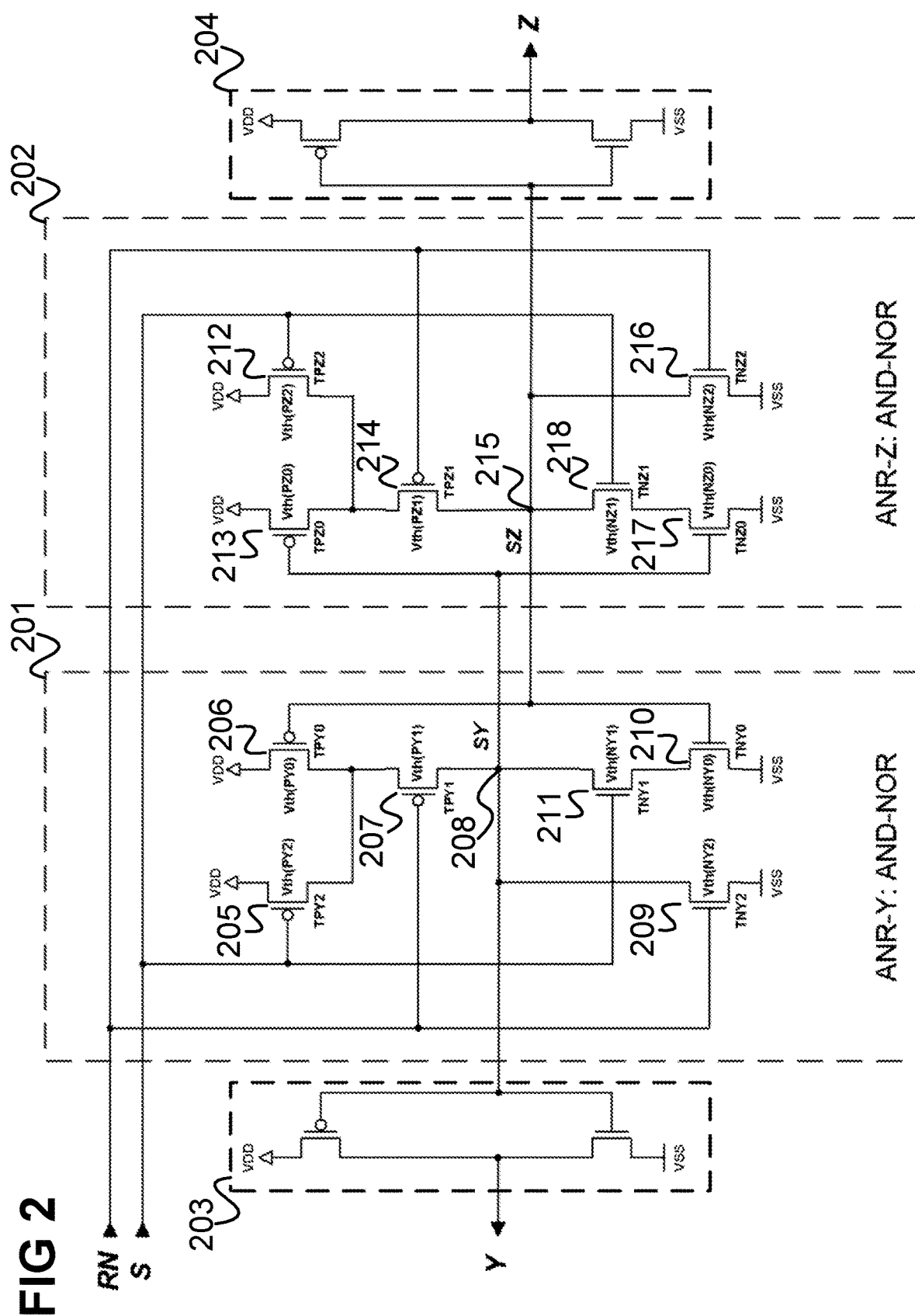
FIG. 2 shows a circuit implementing a logic cell containing two Boolean secrets.

FIG. 2 shows a circuit 200 implementing a logic cell containing two Boolean secrets X0 and X1, which is in this example AND-NOR based. So, the circuit 200 can be seen as an implementation of two ICBC-Xs (namely an ICBC-X0 and an ICBC-X1) at once but a single ICBC-X may be implemented in a similar manner (or, of course, only one of ICBC-X0 and ICBC-X1 may be used to have a single ICBC-X).

Figure 3:
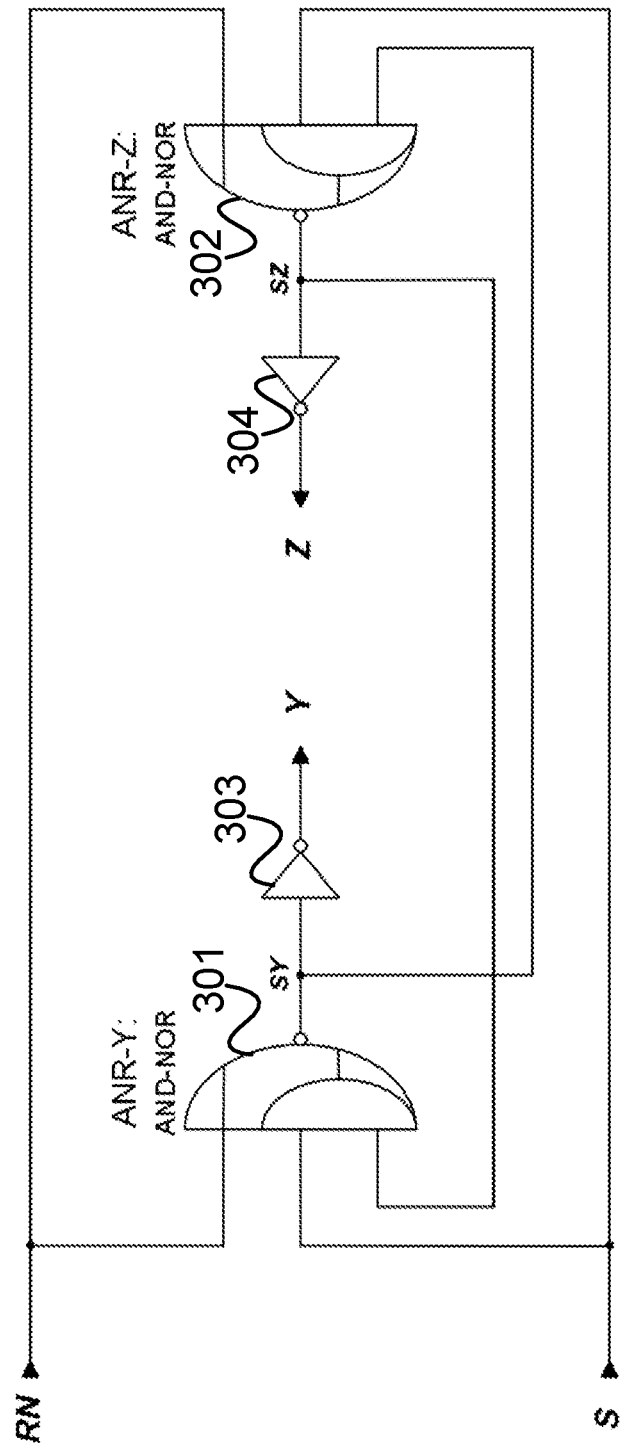
FIG. 3 shows a gate schematic for the circuit of FIG. 2.

FIG. 3 shows a gate schematic for the circuit 200.

The circuit 200 has two control inputs RN and S and two outputs Z and Y. The circuit includes a first AND-NOR 201, 301, a second AND-NOR 202, 302, a first inverter 203, 303 and a second inverter 204, 304.

The first AND-NOR 201 includes a first p-channel FET 205 whose source is connected to the high supply potential (VDD) and whose gate is supplied with the signal S. The first AND-NOR 201 further includes a second p-channel FET 206 whose source is connected to the high supply potential (VDD). The drains of the first p-channel FET 205 and the second p-channel FET 206 are connected to the source of a third p-channel FET 207 whose gate is supplied with the signal RN and whose drain is connected to a first output node (or feedback node) 208 whose state is referred to by SY.

The first AND-NOR 201 further includes a first n-channel FET 209 whose source is connected to the low supply potential (VSS), whose gate is supplied with the signal RN and whose drain is connected to the first output node 208. The first AND-NOR 201 further includes a second n-channel FET 210 whose source is connected to the low supply potential (VSS) and whose drain is connected to the source of a third n-channel FET 211 whose gate is supplied with the signal S and whose drain is connected to the first output node 208.

The second AND-NOR 202 includes a fourth p-channel FET 212 whose source is connected to the high supply potential (VDD) and whose gate is supplied with the signal S. The second AND-NOR 202 further includes a fifth p-channel FET 213 whose source is connected to the high supply potential (VDD). The drains of the fourth p-channel FET 212 and the fifth p-channel FET 213 are connected to the source of a sixth p-channel FET 214 whose gate is supplied with the signal RN and whose drain is connected to a second output node (or feedback node) 215 whose state is referred to by SZ.

The second AND-NOR 202 further includes a fourth n-channel FET 216 whose source is connected to the low supply potential (VSS), whose gate is supplied with the signal RN and whose drain is connected to the second output node 215. The second AND-NOR 202 further includes a fifth n-channel FET 217 whose source is connected to the low supply potential (VSS) and whose drain is connected to the source of a sixth n-channel FET 218 whose gate is supplied with the signal S and whose drain is connected to the second output node 215.

The first output node 208 is further connected to the input of the first inverter 203 whose output is the output Y. Further, the first output node 208 is connected to the gates of the fifth p-channel FET 213 and the fifth n-channel FET 217.

The second output node 215 is further connected to the input of the second inverter 204 whose output is the output Z. Further, the second output node 215 is connected to the gates of the second p-channel FET 206 and the second n-channel FET 210.

The inverters 203, 204 are for example realized by a p-channel FET and an n-channel FET connected serially between the high supply potential and the low potential which receive the inverter's 203, 204 input at their gates and wherein the node between them is the output node of the respective inverter 203, 204.

In the following, it is assumed that p-channel FETs are implemented by pMOS transistors (also referred to as pMOS devices) and n-channel FETs are implemented by nMOS transistors (also referred to as nMOS devices). The circuit 200 as well as the circuits described in the following are for example implemented in CMOS (Complementary Metal Oxide Semiconductor) technology.

For RN=1 the circuit 200 is in its first precharge state:

$RN=1 \Rightarrow (SZ,SY)=(0,0) \Rightarrow (Z,Y)=(1,1).$

For (RN, S)=(0, 0) the circuit 200 is in its second precharge state:

$(RN,S)=(0,0) \Rightarrow (SZ,SY)=(1,1) \Rightarrow (Z,Y)=(0,0).$

The first forbidden transition is given by $(RN,S)=(1,1) \rightarrow (0,1),$ whereby the two competing pull-up paths including the serial connections of the fifth p-channel FET 213, denoted by TPZ0 (having threshold voltage Vth(TPZ0)), and the sixth p-channel FET 214, denoted by TPZ1 (having threshold voltage Vth(TPZ1)), for SZ, as well as the second p-channel FET 206, denoted by TPY0 (having threshold voltage Vth(TPY0)), and the third p-channel FET 207, denoted by TPY1 (having threshold voltage Vth(TPY1)), for SY, are activated.

Thus, the two different threshold voltage configurations $|Vth(TPZ1)|<|Vth(TPY1)|; |Vth(TPZ0)|<|Vth(TPY0)|$ and $|Vth(TPZ1)|>|Vth(TPY1)|; |Vth(TPZ0)|>|Vth(TPY0)|$ correspond to the two different values X1=0 and X1=1 for the first forbidden transition $(RN,S)=(1,1) \rightarrow (0,1) \Rightarrow (Z,Y)=(1,1) \rightarrow (X1, \text{not}(X1)).$ The second forbidden transition is given by $(RN,S)=(0,0) \rightarrow (0,1),$ whereby the two competing pull-down paths, including the serial connections of the fifth n-channel FET 217, denoted by TNZ0, and the sixth n-channel FET 218, denoted by TNZ1, for SZ, as well as the second n-channel FET 210, denoted by TNY0, and the third n-channel FET 211, denoted by TNY1 for SY, are activated.

Thus, the two different threshold voltage configurations $Vth(TNZ1)<Vth(TNY1); Vth(TNZ0)<Vth(TNY0)$ and $Vth(TNZ1)>Vth(TNY1); Vth(TNZ0)>Vth(TNY0)$ correspond to the two different values X0=1 and X0=0 for the second forbidden transition $(RN,S)=(0,0) \rightarrow (0,1) \Rightarrow (Z,Y)=(0,0) \rightarrow (X0, \text{not}(X0)).$ A basic ICBC may be defined in the following abstract way: the ICBC includes an input S and an output Z. In its DEFAULT STATE the input S is set to \A=not (A), where A=0 or 1, which implies Z=D, where D=0 or 1 denotes the ICBC's default output value that may be identified by standard reverse engineering methods.

An ICBC ACCESS is initiated by setting S to A, which implies Z=X, where X=0 or 1 denotes the ICBC's Boolean secret, i.e. a predictable and predetermined value X, where the value of X for a given ICBC incarnation or particular instance on an IC may for instance depend on differential threshold voltage programming as indicated above for the ICBC circuitry, so that X cannot be identified by standard reverse engineering methods.

According to various embodiments, the access to Boolean secrets (such as X0 and X1 in the circuit 200, 300) is password protected. According to one embodiment, such a password protection is provided by a circuit which is in the following referred to as a key-lock gate.

Figure 4:
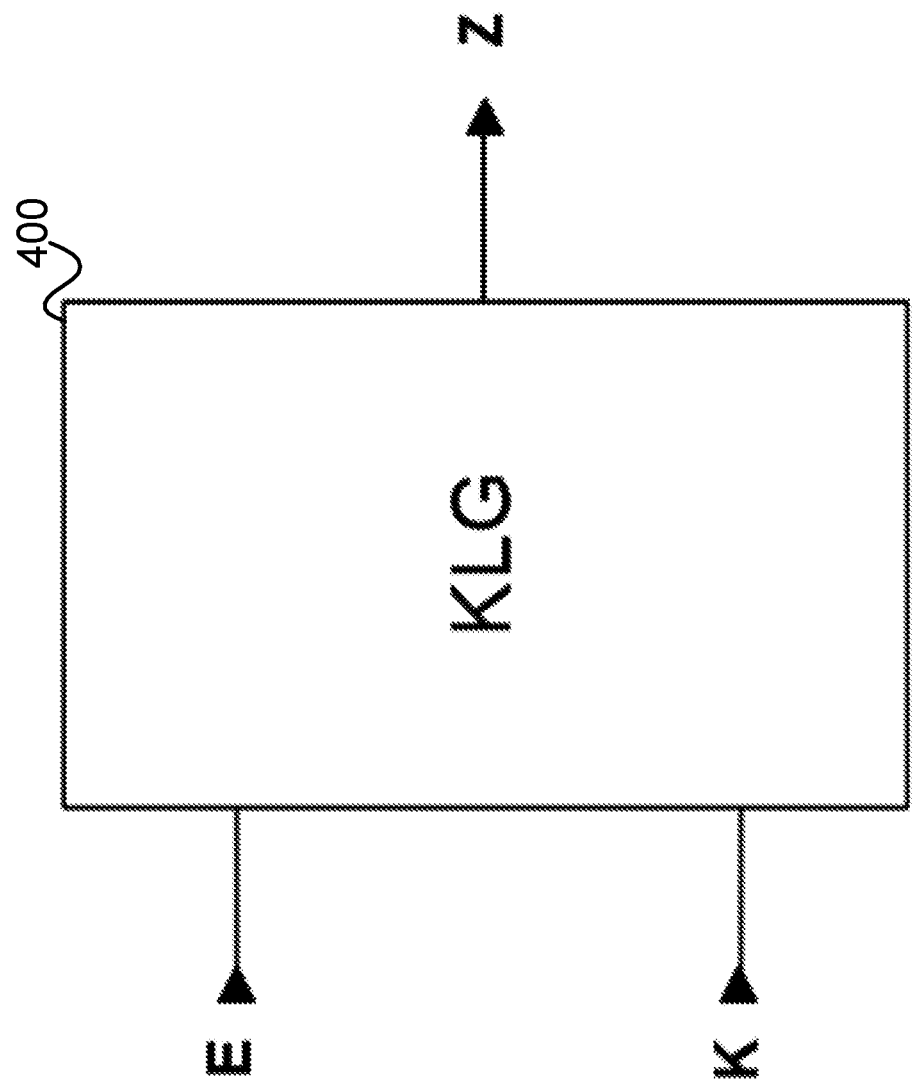
FIG. 4 illustrates a basic key-lock gate for Boolean secrets.

FIG. 4 illustrates a basic key-lock gate (KLG) 400 (as gate symbol) for Boolean secrets including two inputs E and K, as well as the output Z.

The Key-Lock Gate's Boolean function is for instance (i.e. for a first embodiment) given by:

DEFAULT STATE: $E=\backslash A=\text{not}(A), \Rightarrow Z=D,$ where A, D=0 or 1;

That is, for E=\A (independently of K) the output Z is set to a DEFAULT value D.

KEY-LOCK ACCESS VALID: $K=V,$ and
$E=\backslash A \rightarrow A \Rightarrow Z=D \rightarrow X,$ where V, X=0 or 1;

That is, for a predetermined Boolean value V (either equal to 0 or 1) of input K, the input transition E=\A→A results in the output transition Z=D→X, i.e. Z is set to a predictable and predetermined value X, where the value of X may for instance depend on differential threshold voltage programming like indicated above for ICBC cells, so that X cannot be identified by state-of-the-art reverse engineering methods.

KEY-LOCK ACCESS INVALID: $K=\backslash V,$
$E=\backslash A \rightarrow A \Rightarrow Z=D \rightarrow R,$ where \V, R=0 or 1, and \V=not (V);

That is, for a predetermined Boolean value \V=1 or 0 of input K, the input transition E=\A→A results in the output transition Z=D→R, i.e. Z is set to an unpredictable and undetermined Boolean value R; where the (random) value of R results from a metastable state which the KLG 400 enters upon K=\V, E=\A→A, so that particular values of R may be induced by random process variations, temperature or supply voltage fluctuations, (random) capacitive and/or substrate couplings, noise and/or aging of relevant active devices like transistors: thus, R may be considered equivalent to the Boolean result of an access to a Physical Unclonable Function (PUF) or a Physically Obfuscated Circuit (POC).

This means that KEY-LOCK ACCESS INVALID may in the first instance be interpreted as being an INVALID access to the KLG's Boolean secret X (applying the INVALID key bit K=\V).

On the other hand, KEY-LOCK ACCESS INVALID may also be interpreted and deployed as being an access to a PUF or POC, at least if the random KLG response R is statistically satisfactory and reproducible enough for the purpose of representing an IC "fingerprint" that is for instance an IC individual secret key.

Figure 5:
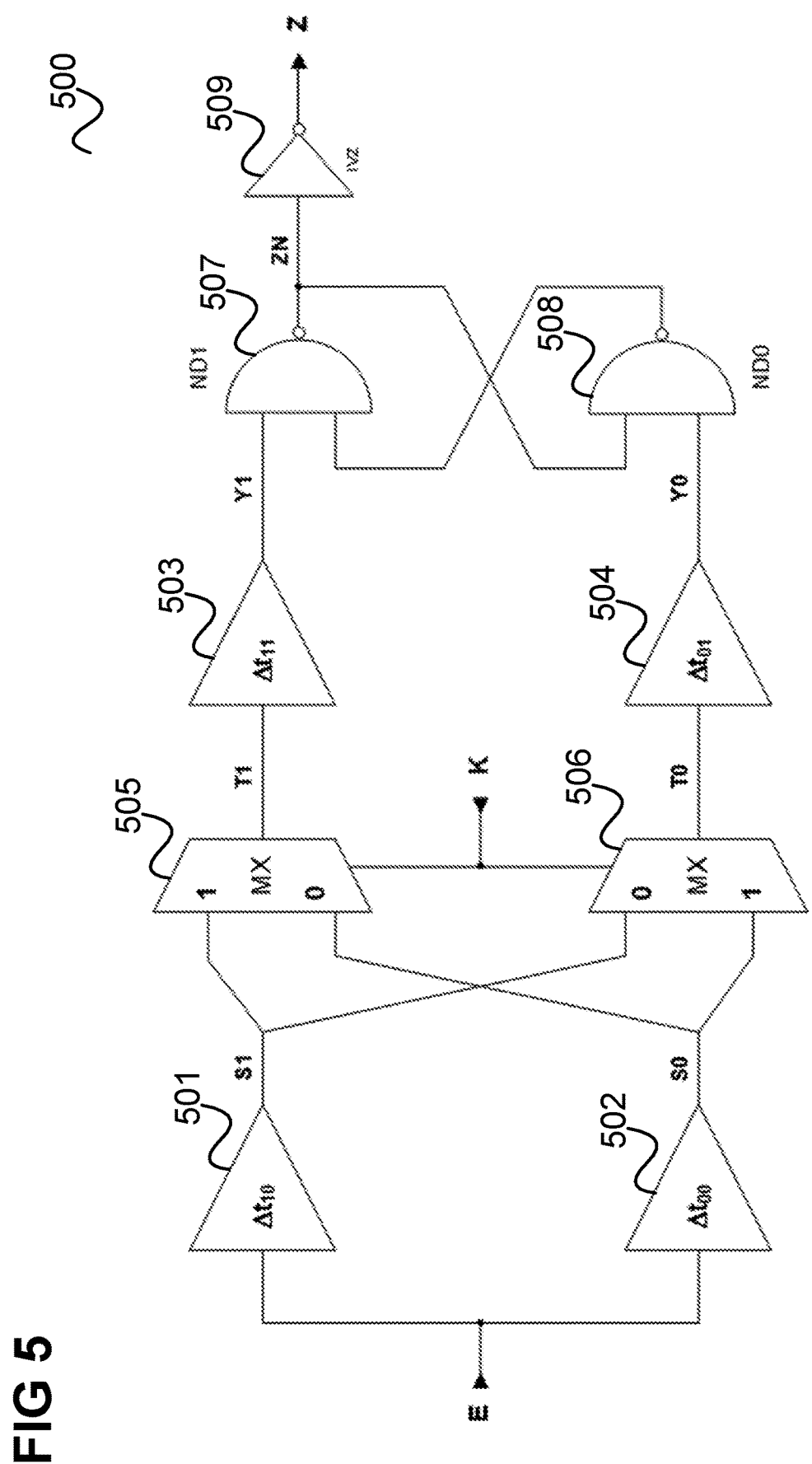
FIG. 5 shows a circuit for implementing a key-lock gate according to a first implementation example.

FIG. 5 shows a circuit 500 for implementing a KLG according to a first implementation example.

The circuit 500 is composed of two dual-buffer stages (DBS) including delay buffers 501-504 with individual delays $\Delta t_{10}$ and $\Delta t_{00}$ for the first DBS, and $\Delta t_{11}$, and $\Delta t_{01}$ for the second DBS, respectively, a conditional signal transposition stage with inputs S1 and S0 and outputs T1 and T0, including two multiplexers MX 505, 506 both of which receive the control signal K, as well as an output stage formed by a NAND-based SET-RESET Flip-Flop including two cross-coupled NAND gates ND1 507 and ND0 508 and an inverter IVZ 509 for providing the KLG output signal Z. The KLG input E is input to the two delay buffers $\Delta t_{10}$ and $\Delta t_{00}$, T1 is input to the delay buffer $\Delta t_{11}$, T0 is input to the delay buffer $\Delta t_{01}$, and Y1 and Y0 are inputs to the SET-RESET Flip-Flop output stage.

In this embodiment A is equal to 1, and D is equal to 0 i.e. for E=\A=not (A)=0, the KLG 400 resides in its DEFAULT state, where Z=D=0: for E=0 it follows that S1=S0=T1=T0=Y1=Y0=0, independent of K, so that both NAND outputs are set to 1, i.e. ZN=1, resulting in Z=0, i.e. D=0.

The KLG's KEY-LOCK property is realized by choosing the individual delay values as follows:

$\Delta t_{10}=\tau_j$, $\Delta t_{00}=\tau_k$, as well as $\Delta t_{11}=\tau_j$ or $\tau_k$ and $\Delta t_{01}=\tau_k$ or $\tau_j$, where $\tau_j$ is not equal to $\tau_k$. Thus, for K=0, the path from E to Y1 exhibits a delay of $\Delta t_{00}+\Delta t_{11}$ (plus the delay of the respective MX 505, 506), i.e. either is equal to $\tau_k+\tau_j$ or is equal to $\tau_k+\tau_k$ (plus the delay of MX), and the path from E to Y0 exhibits a delay of $\Delta t_{10}+\Delta t_{01}$ (plus the delay of MX), i.e. either is equal to $\tau_j+\tau_k$ or is equal to $\tau_j+\tau_j$ (plus the delay of MX). This means that, depending on the choice of the individual delay buffer values, the values for the path delay from E to Y1 and from E to Y0 are either nominally identical ($\tau_j+\tau_k$ plus the MX delay $\Delta t_{MX}$), or they differ by $2\tau_k-2\tau_j$ (assuming that the delays of the MX gates are nominally equal).

On the other hand, for K=1 the path from E to Y1 exhibits a delay of $\Delta t_{10}+\Delta t_{11}$ (plus the delay $\Delta t_{MX}$ of MX), i.e. either equal to $\tau_j+\tau_j$ or equal to $\tau_j+\tau_k$ (plus $\Delta t_{MX}$), and the path from E to Y0 exhibits a delay of $\Delta t_{00}+\Delta t_{01}$ (plus $\Delta t_{MX}$), i.e. either equal to $\tau_k+\tau_k$ or equal to $\tau_k+\tau_j$ (plus $\Delta t_{MX}$). This means that, depending on the choice of the individual delay buffer values, the values for the path delay from E to Y1 and that from E to Y0 either differ by $2\tau_j-2\tau_k$ (assuming that the delays of the MX gates are nominally equal), or they are nominally identical ($\tau_j+\tau_k$ plus $\Delta t_{MX}$).

Table 1 below summarizes the above results. Additionally, the values V of K are given, i.e. the value V=1 if a KEY-LOCK ACCESS VALID is executed, and V=0 if a KEY-LOCK ACCESS INVALID is executed:

TABLE 1

| $\Delta t_{10}$ | $\Delta t_{11}$ | $\Delta t_{00}$ | $\Delta t_{01}$ | K | $\Delta t(Y1) - \Delta t(Y1)$ | V |
|---|---|---|---|---|---|---|
| $\tau_j$ | $\tau_j$ | $\tau_k$ | $\tau_k$ | 0 | 0 | 0 |
| $\tau_j$ | $\tau_j$ | $\tau_k$ | $\tau_k$ | 0 | $2\tau_k - 2\tau_j$ | 1 |
| $\tau_j$ | $\tau_k$ | $\tau_k$ | $\tau_j$ | 1 | $2\tau_j - 2\tau_k$ | 1 |
| $\tau_j$ | $\tau_k$ | $\tau_k$ | $\tau_j$ | 1 | 0 | 0 |

As for capturing the respective delay differences at nodes Y1 and Y0, the function of the NAND-based RS-FF is considered.

First of all, the start value 0 at the KLG input E results in a 0 at the Y1 and Y0 inputs of the RS-FF (independent of K), so that the RS-FF is set to its default (pre-charge) state in which the outputs of both NAND gates ND1 and ND0 are 1, so that Z=0. To evaluate the outputs Y1 and Y0 of the competing signal paths for a given input K, a rising signal edge is applied to E. Then, rising signal edges race through the two respectively configured delay paths (depending on K), and the arbiter RS-FF at the outputs of the two paths determines which of the two delays is smaller: Z=1 if the signal, i.e. the rising edge arriving at the RS-FF input Y1 is faster, and Z=0 if the rising edge arriving at Y0 is faster. It should be noted that the signal arriving later does not change the value of Z anymore since then Y1=Y0=1, i.e. the RS-FF switches to its data storing state.

Hence, a rising edge at E results in rising edges at both Y1 and Y0, but only the faster of them will have an effect on the RS-FF's content. Moreover, for a VALID access to the KLG, i.e. for properly set K=V, the rising edge of E results in Z=X. Otherwise, for K=\V, Z will assume an unpredictable and undetermined Boolean value R.

In the following, examples of realizations for the delay buffers 501-504 are given.

Figure 6:
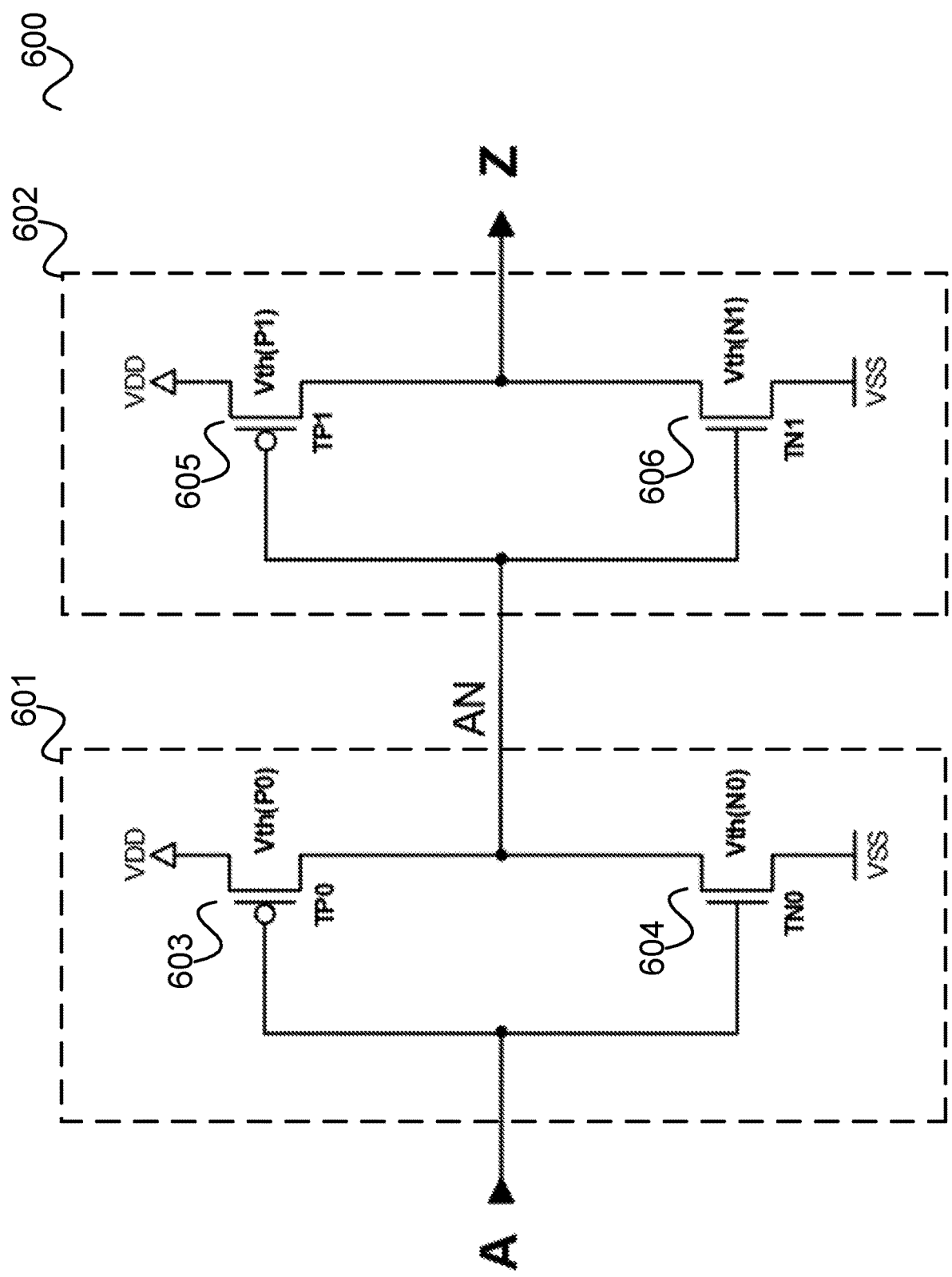
FIG. 6 shows a delay buffer including two serially connected inverters.

FIG. 6 shows a delay buffer 600 including two serially connected inverters 601, 602 with the property that different threshold voltages are provided in order to get two different buffer incarnations: a relatively fast one and a relatively slow one for a rising edge at the buffer's input A.

The first inverter 601 is formed by a serial connection of a first p-channel FET TP0 603 and a first n-channel FET TN0 604 and the second inverter 602 is formed by serial connection of a second p-channel FET TP1 605 and a second n-channel FET TN1 606.

A rising edge at A is propagated relatively fast to the buffer's output Z for relatively low (absolute values of the) threshold voltages Vth(TN0) and Vth(TP1), and relatively slow to the buffer's output Z for relatively high (absolute values of the) threshold voltages Vth(TN0) and Vth(TP1). (It should be noted that Vth(.) herein denotes the threshold voltage of the indicated FET).

In other words, assuming two threshold voltage options VthN-low and VthN-high for the NMOS devices 604, 606, and VthP-low and VthP-high for the PMOS devices 603, 605, the buffer delays are as follows:

$\Delta t_{BUF}=\Delta t_{fast}$ if $Vth(TN0)=VthN$-low and $Vth(TP1)=VthP$-low, $\Delta t_{BUF}=\Delta t_{slow}$ if $Vth(TN0)=VthN$-high and $Vth(TP1)=VthP$-high.

The remaining transistors TP0 603 and TN1 606 can either be chosen to have the same threshold voltages for both the fast and the slow buffer incarnations, or, for the fast buffer incarnation, TP0 603 may have VthP-high and TN1 606 may have VthN-high, whereas for the slow buffer incarnation, TP0 603 may have VthP-low and TN1 606 may have VthN-low.

Figure 7:
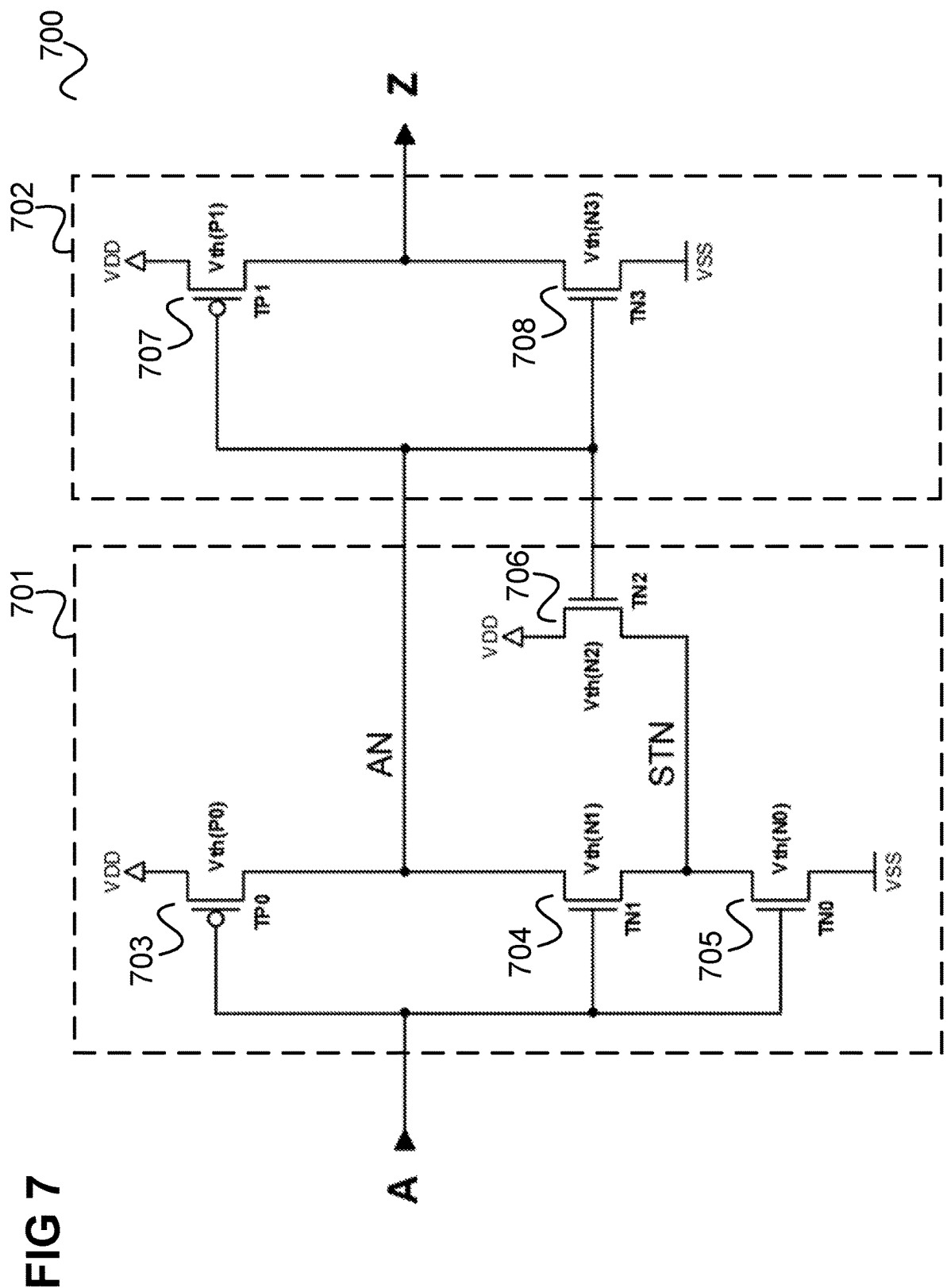
FIG. 7 shows a delay buffer according to another embodiment including a partial Schmitt trigger serially connected to an inverter.

FIG. 7 shows a delay buffer 700 according to another embodiment including a partial Schmitt trigger 701 (with the Schmitt trigger property only for a rising edge at its input), serially connected to an inverter 702 with the property that different threshold voltages are provided in order to get a relatively fast or a relatively slow Schmitt-trigger (ST) buffer for a rising edge at the Schmitt trigger buffer's input A.

The Schmitt trigger 701 is formed by a serial connection of a first p-channel FET TP0 703, a first n-channel FET TN1 704 and a second n-channel FET TN0 705 as well as a third n-channel FET TN2 706 connected between the high supply potential (VDD) and the point of connection of the first n-channel FET TN1 704 and the second n-channel FET TN0 705 and whose gate is connected to the input of the inverter 702.

The inverter 702 is formed by serial connection of a second p-channel FET TP1 707 and a fourth n-channel FET TN3 708.

The input of the inverter is further connected to the point of connection of the first p-channel FET 703 and the first n-channel FET 704.

The partial Schmitt trigger's property related to a rising edge at input A is realized by means of the negative feedback NMOS device TN2 706 whose gate is connected to the Schmitt trigger output AN (having potential V(AN)) and whose drain and source are connected to the positive supply voltage VDD and to the node STN between NMOS devices TN0 705 and TN1 704, respectively. Thus, before the rising edge at A (i.e. as long as A=0) the Schmitt trigger output AN is at high potential VDD, so that TN2 706 is close to its ON state and node STN lies at approximately VDD-Vth(TN2). Then, with the rising edge at A, node STN (having potential V(STN)) is pulled down towards VSS, the low supply potential, so that current is drawn not only from AN through TN1 704 but also from VDD through TN2 706.

As a consequence, as long as V(AN)−V(STN)>Vth (TN2), NMOS TN2 706 is in its ON state or close to it and the current through TN2 706 realizes a negative feedback decelerating the speed with which AN is pulled towards VSS.

This negative feedback depends on Vth(TN2): the smaller Vth(TN2), the stronger the negative feedback will be and vice versa.

Hence, a rising edge at A is propagated relatively fast to the buffer's output Z for relatively low absolute values of the threshold voltages Vth(TN0), Vth(TN1) and Vth(TP1) as well as a relatively high threshold voltage Vth(TN2) for the negative feedback NMOS device TN2 706.

On the other hand, a rising edge at A is propagated relatively slow to the buffer's output Z for relatively high absolute values of the threshold voltages Vth(TN0), Vth (TN1) and Vth(TP1) as well as a relatively low threshold voltage Vth(TN2) for the negative feedback NMOS device TN2 706.

In other words, assuming again two threshold voltage options VthN-low and VthN-high for the NMOS devices, and VthP-low and VthP-high for the PMOS devices, the buffer delays are:

$$\Delta t_{BUF} = \Delta t_{fast} \text{ if } Vth(TN0) = Vth(TN1) = VthN\text{-low}, Vth(TP1) = VthP\text{-low, and } Vth(TN2) = VthN\text{-high};$$

$$\Delta t_{BUF} = \Delta t_{slow} \text{ if } Vth(TN0) = Vth(TN1) = VthN\text{-high}, Vth(TP1) = VthP\text{-high, and } Vth(TN2) = VthN\text{-low}.$$

The remaining transistors TP0 703 and TN3 708 can either be chosen to have the same threshold voltages for both the fast and the slow buffer incarnations, or, for the fast buffer incarnation, TP0 703 may have VthP-high and TN3 708 may have VthN-high, whereas for the slow buffer incarnation, TP0 703 may have VthP-low and TN3 708 may have VthN-low.

Figure 8:
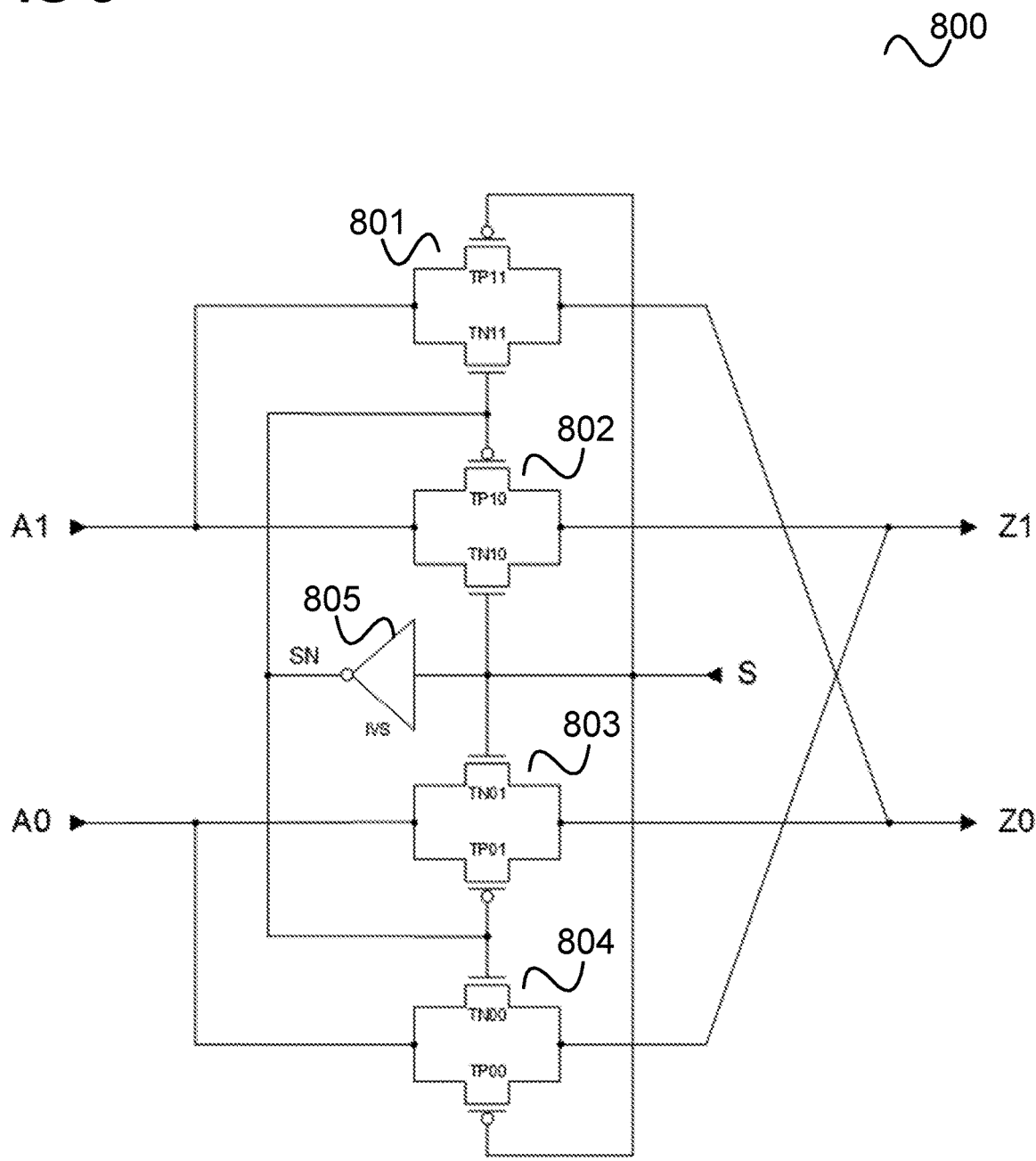
FIG. 8 shows a circuit implementing a multiplexer which may be used for implementing the multiplexers of the circuit of FIG. 5.

FIG. 8 shows a circuit 800 implementing a multiplexer which may be used for implementing the multiplexers 505, 506 (and thus the conditional transposition stage) of the circuit of FIG. 5.

The circuit 800 is a multiplexer implementation based on transmission gates 801-804 arranged in two pairs of transmission gates, wherein each transmission gate is formed of a p channel FET and an n channel FET. The first transmission gate 801 has an n channel FET whose gate is connected to the gate of the p channel FET of the second transmission gate 802. Similarly, the fourth transmission gate 804 has an n channel FET whose gate is connected to the gate of the p channel FET of the third transmission gate 803. Additionally, the gate of the p channel FET of the first transmission gate 801 is connected to the gate of the p channel FET of the fourth transmission gate 804. The transmission gates of the first pair are supplied with a first data input value A0 and the transmission gates of the second pair are supplied with a second data input value A1. An inverter 805 is connected to the control input. The output of the inverter 805 is connected to the connection node within the transmission gate pairs.

For S=0, input A1 is transferred to output Z0 and A0 to Z1, whereas for S=1 input A1 is transferred to output Z1 and A0 to Z0. Thus, it realizes the Boolean functions $$Z1 = S \cdot A1 + \overline{S} \cdot A0$$

$$Z0 = \overline{S} \cdot A1 + S \cdot A0.$$

The input signals A1 and A0 in FIG. 8 correspond to the signals S1 and S0 in FIG. 5, the control input S in FIG. 8 corresponds to control input K in FIG. 5 and the outputs Z1 and Z0 in FIG. 8 correspond to the signals T1 and T0 in FIG. 5.

An alternative KLG implementation provides masked transposition stages in order to prevent semi-invasive side channel attacks employing e.g. Laser Voltage Probing (LVP) or Photon Emission (PE) and aiming at determining the value V of the transposition input K, i.e. the valid key bit for which the Boolean secret X is generated by the KLG 400. Examples for masked transpositions are shown in FIG. 9 and FIG. 10.

Figure 9:
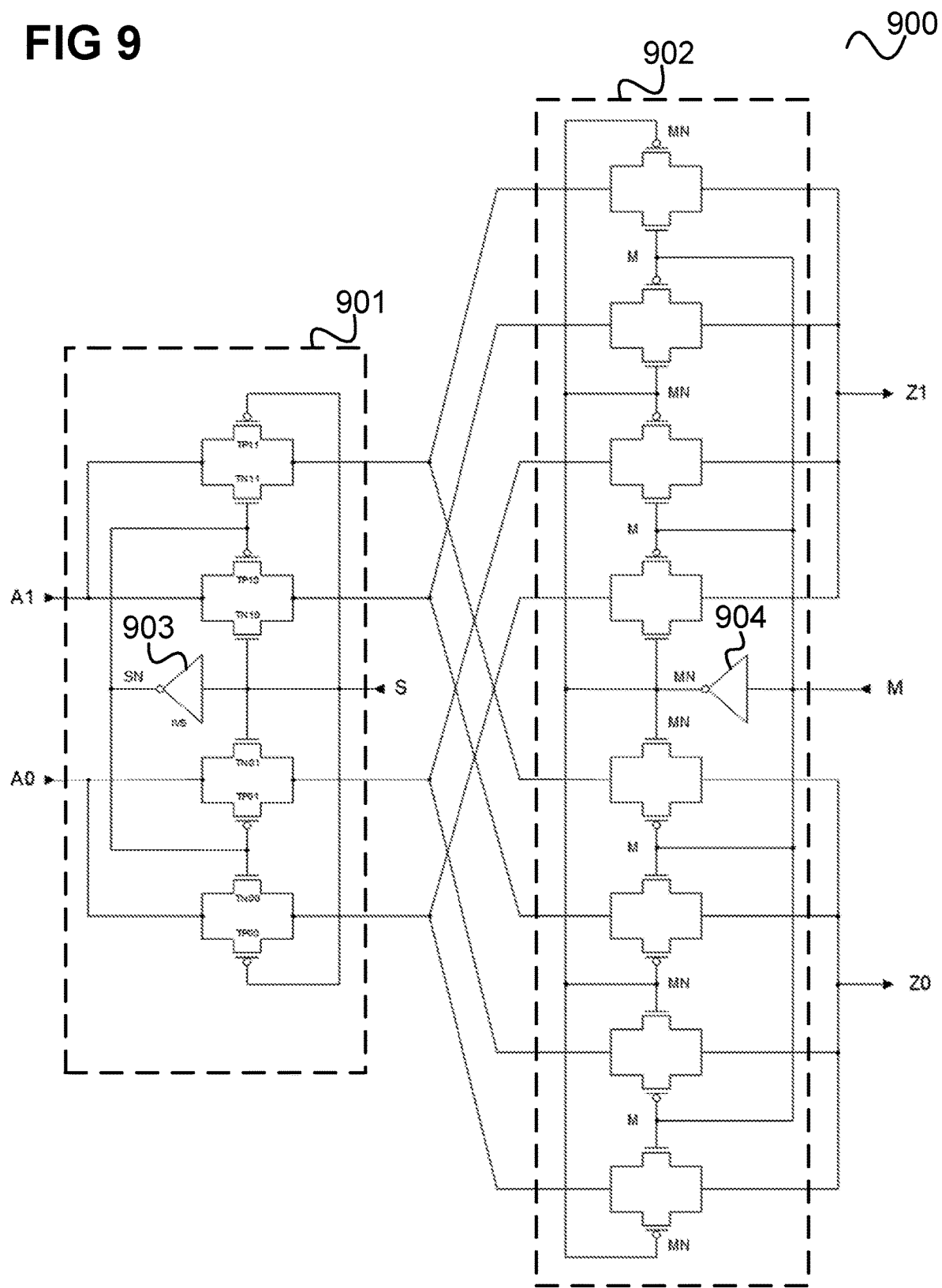
FIG. 9 shows a circuit for a transmission gate implementation of a masked multiplexer for a masked transposition stage.
Figure 10:
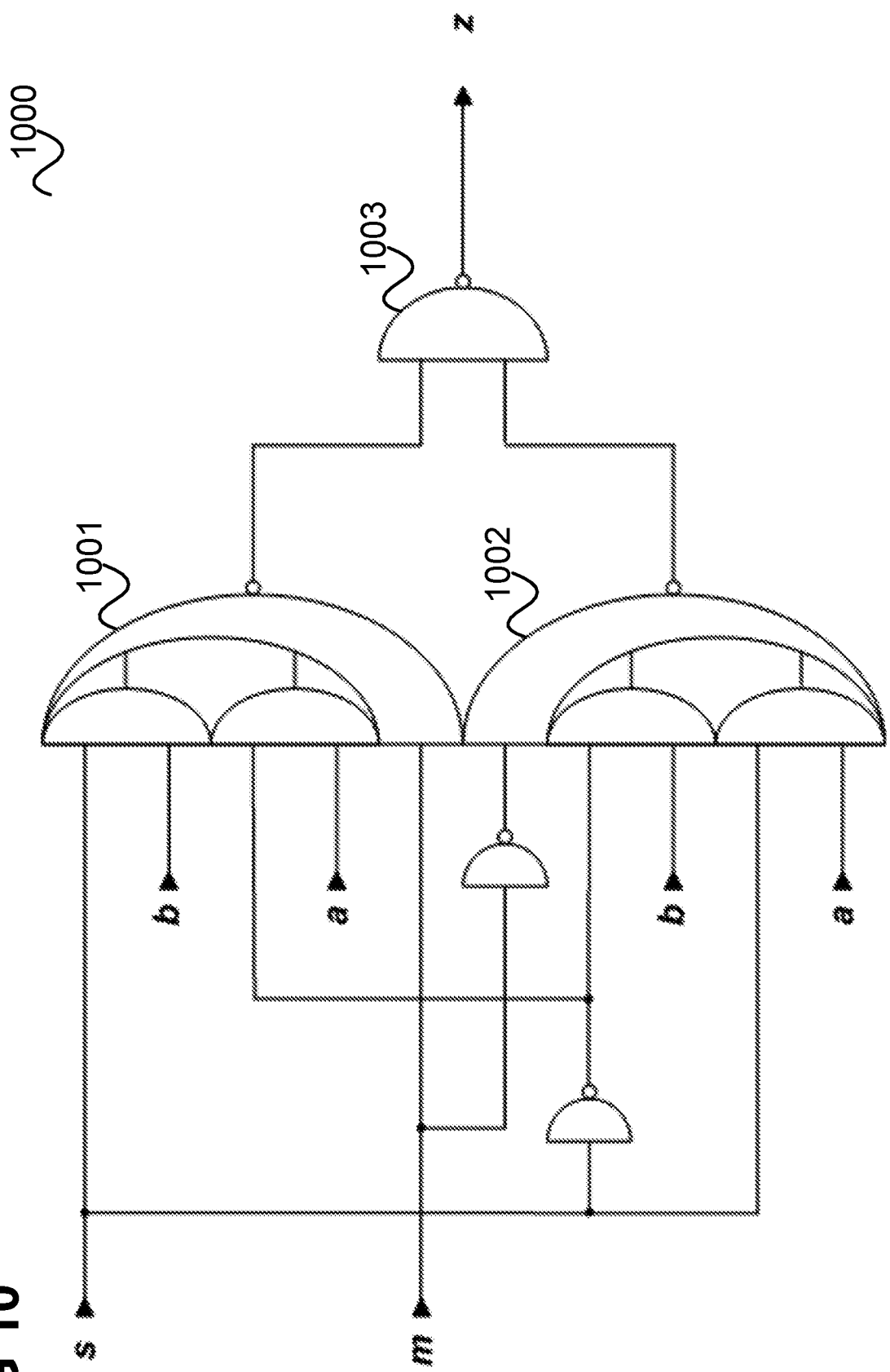
FIG. 10 shows a circuit for a logic gate implementation of a masked multiplexer for a masked transposition stage.

FIG. 9 shows a circuit 900 for a transmission gate implementation of a masked multiplexer for a masked transposition stage.

The circuit 900 includes a first stage 901 similar to the multiplexer implementation of FIG. 8 including a (first) inverter 903 receiving a (first) control signal S and a second stage 902 having a similar structure of connected transmission gates (but having two groups of four transmission gates instead of two pairs) and having a second inverter 904 receiving a second control signal M. It should be noted that the second inverter 904 is arranged in a slightly different manner than the first inverter 903: in particular, it supplies the connection nodes between the two groups of transmission gates.

The circuit 900 realizes the Boolean functions:

$$Z1 = (S \cdot \overline{M} + \overline{S} \cdot M) \cdot A1 + (\overline{S} \cdot \overline{M} + S \cdot M) \cdot A0$$

$$Z0 = (S \cdot M + \overline{S} \cdot \overline{M}) \cdot A1 + (S \cdot \overline{M} + \overline{S} \cdot M) \cdot A0$$

The control signal values S and M can be seen as shares of a masked control signal.

FIG. 10 shows a circuit 1000 for a logic gate implementation of a masked multiplexer for a masked transposition stage.

It includes two complex gates which receive signals a, b, m (gate 1001 inverted, gate 1002 non-inverted) and s (both inverted and non-inverted) and whose outputs are combined by an NAND gate 1003 such that the circuit 1000 realizes the Boolean function $$z = \overline{\overline{m \cdot (\overline{s} \cdot a + s \cdot b)} \cdot \overline{\overline{m} \cdot (s \cdot a + \overline{s} \cdot b)}} = \ldots (s \cdot \overline{m} + \overline{s} \cdot m) \cdot a + (s \cdot m + \overline{s} \cdot \overline{m}) \cdot b$$

(e.g. in static CMOS implementation).

The substitutions S=s, M=m, A132 a, and A0=b yield the equation for Z1, whereas Z0 is obtained with the substitutions S=s, M=m, A1=b and A0=a.

Figure 11:
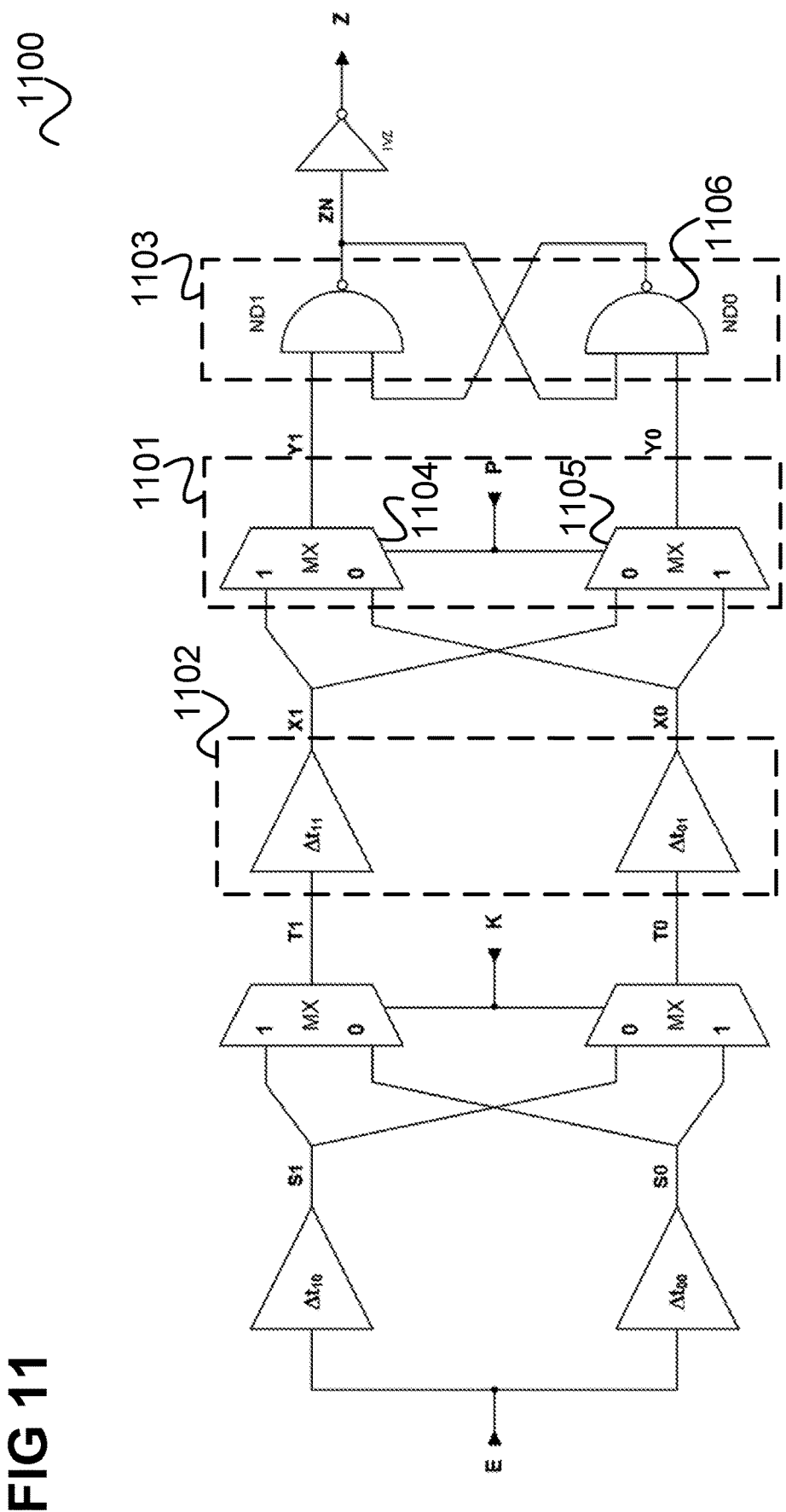
FIG. 11 shows a circuit for implementing a key-lock gate according to a second implementation example.

FIG. 11 shows a circuit 1100 for implementing a KLG according to a second implementation example.

The KLG implementation of FIG. 11 is an extension of the one of FIG. 5 by the addition of a second conditional transposition stage 1101 (formed by two multiplexers 1104, 1105 similarly to the first transposition stage formed by multiplexers 505, 506). The second transposition stage 1101 has a control input P and is arranged between the second delay buffer stage 1102 and the input of the output stage (RS-FF) 1103.

The additional transposition stage 1101 for the RS-FF inputs prevents effectively semi-invasive side channel attacks employing e.g. Laser Voltage Probing (LVP) or Photon Emission (PE) and aiming at determining the value X of the KLG's Boolean secret, since in this implementation a XNOR masked output Z is obtained upon activation of the KLG with a rising edge at E:

$$Z = X \cdot P + \overline{X} \cdot \overline{P}$$

In other words, the output of the NAND gate ND0 1106 of the RS-FF which does not provide its output, as well as the RS-FFs output ZN and Z (in general all RS-FF external and internal nodes) depend not only on X but also on P so that any observation with e.g. LVP or PE will yield inconclusive results because of the statistical nature of these analysis methods.

What is more, the signal P may also be interpreted and provided by external circuitry as an additional key share L for unlocking X that may be masked with a random mask Q, e.g. a one-time-pad, so that $$P = L \cdot \overline{Q} + \overline{L} \cdot Q.$$

In the above implementation examples, the KLG's Boolean secret X is generated upon a rising edge of E (in general upon a rising or a falling edge of E as indicated above with the default value A for E).

Figure 12:
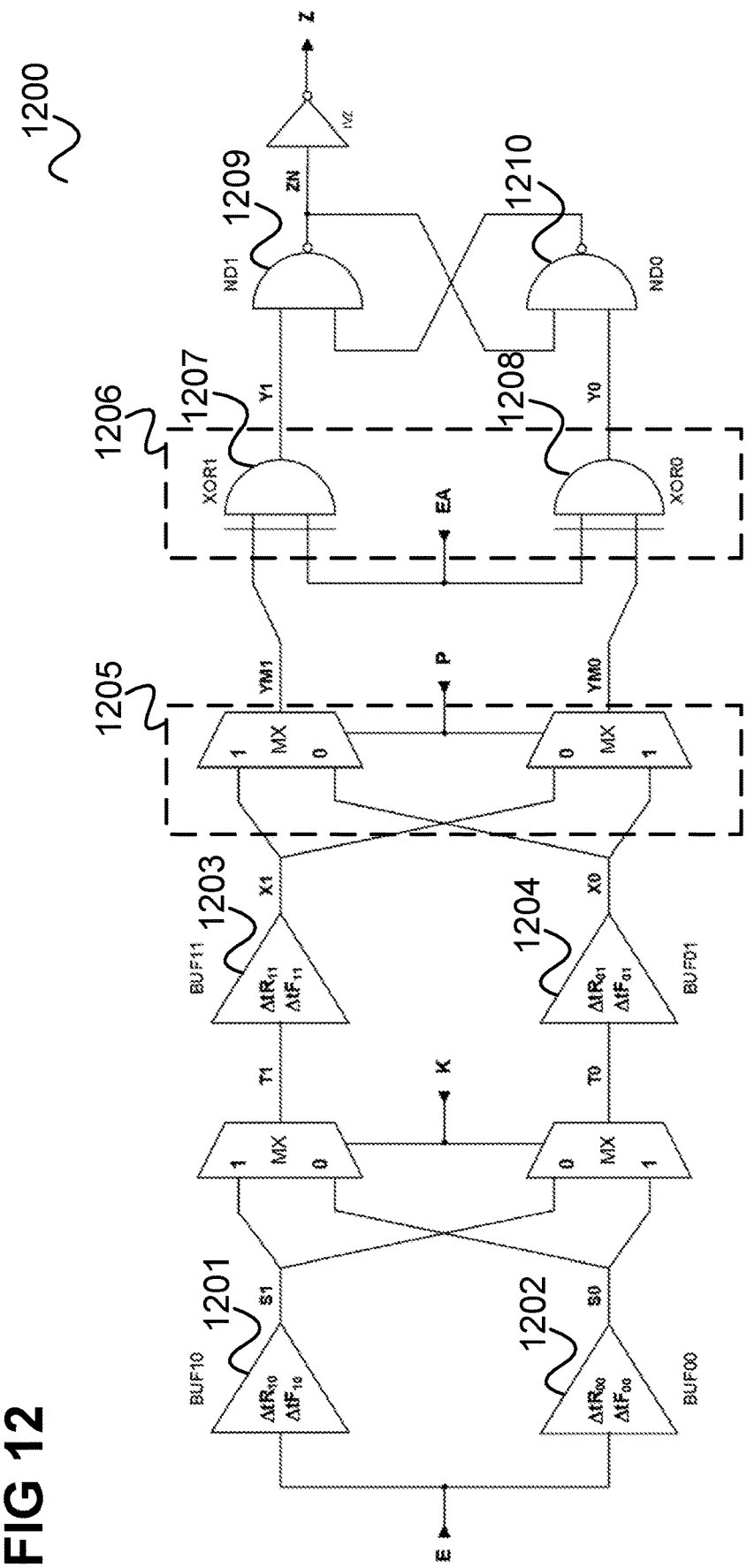
FIG. 12 shows a circuit for an extension of this concept in that it gives an implementation of a key-lock gate embodiment that provides the generation of edge-dependent Boolean secrets.

FIG. 12 shows a circuit 1200 for an extension of this concept in that it gives an implementation of a KLG embodiment that provides the generation of edge-dependent Boolean secrets X1 and X0.

To that end, the dual-buffer stage is each formed of two delay buffers 1201, 1202 and 1203, 1204 including individual and edge-dependent delays $\Delta tR_{kl}$ and $\Delta tF_{kl}$, k, l=0,1, for rising and falling edges at their inputs, an additional transposition stage 1205 as in the example of FIG. 11 as well as an additional XOR stage 1206 between the additional transposition stage 1205 and the RS-FF inputs Y1 and Y0. The XOR stage 1206 includes two XOR gates 1207, 1208 receiving each as first input a respective output YM1, YM0 of the additional transposition stage 1205 and receiving as second input a signal EA.

This KLG implementation of FIG. 12 (referred to as double-edge KLG implementation) is operated as follows: initially E (input signal of the circuit 1200, i.e. input to the first buffer stage) is set to 0 and EA is set to 0, so that the XOR gates 1207, 1208 can be considered as being non-inverting buffers for their inputs YM1 and YM0. Thus, with E=0 the RS-FF inputs Y1 and Y0 are also set to 0 (independent of K and P), so that the RS-FF resides in its default (pre-charge) state as above for the embodiments illustrated with FIGS. 5 and 11. That is, the outputs of both NAND gates ND1 1209 and ND0 1210 are set to 1, so that Z=0.

Then, to evaluate the differential delay for given inputs K and P of the competing signal paths from E to Y1 and Y0, respectively, a rising signal edge is applied to E. Then, rising signal edges race through the two respectively configured delay paths (depending on K and P), and the arbiter RS-FF at the outputs of the two paths determines which of the two delays is smaller: Z=1 if the signal, i.e. the rising edge arriving at the RS-FF input Y1 is faster, and Z=0 if the rising edge arriving at Y0 is faster. It should be noted that the signal arriving later does not change the value of Z anymore since then Y1=Y0=1, i.e. the RS-FF switches to its data storing state.

In other words, for a VALID access to the KLG, i.e. for properly set K=V1 (where V1 denotes the Boolean value for which a KEY-LOCK ACCESS VALID can be performed upon the rising edge of E), the rising edge of E results in $Z = X1 \cdot P + \overline{X1} \cdot \overline{P}$, where X1 denotes the Boolean secret derived with the rising edge of E.

In order to output the second Boolean secret of the KLG circuit 1200, generated upon a falling edge of E, first EA is set to 1, so that the two XOR gates 1207 and 1208 invert their inputs YM1 and YM0 whereupon the RS-FF inputs Y1 and Y0 are again set to 0 (independent of K and P), so that the RS-FF is again set to its default (pre-charge) state: the outputs of both NAND gates ND1 1209 and ND0 1210 are set to 1, so that Z=0.

After that, control input K is set to V0 (denoting the Boolean value for which a KEY-LOCK ACCESS VALID can be performed upon the falling edge of E), and P may change or not to mask the KLG output Z differently or not with respect to the previous access.

Then, to evaluate for the chosen inputs K and P the differential delay of the competing signal paths from E to Y1 and Y0, respectively, a falling signal edge is applied to E. Then, falling signal edges race through the two respectively configured delay paths (depending on K and P), and the arbiter RS-FF at the outputs of the two paths determines which of the two delays is smaller, taking into account that now the two XOR gates XOR1 and XOR0 invert YM1 and YM0, so that again rising edges arrive at Y1 and Y0: Z=1 if the rising edge arriving at the RS-FF input Y1 is faster, and Z=0 if the rising edge arriving at Y0 is faster. It should be noted that the signal arriving later does not change the value of Z anymore since then Y1=Y0=1, i.e. the RS-FF switches to its data storing state.

In other words, for a VALID access to the KLG, i.e. for K=V0, the falling edge of E results in $Z = X0 \cdot P + \overline{X0} \cdot \overline{P}$, where X0 denotes the Boolean secret derived with the falling edge of E.

In order to realize individual and edge-dependent delays for the buffers 1201-1204 of the dual-buffer stages of the embodiment shown in FIG. 12, for instance the buffer of FIG. 6 may be deployed in the following way.

A rising edge at A is propagated relatively fast to the buffer's output Z for relatively low absolute values of the threshold voltages Vth(TN0) and Vth(TP1), and relatively slow to the buffer's output Z for relatively high absolute values of the threshold voltages Vth(TN0) and Vth(TP1).

In other words, assuming two threshold voltage options VthN-low and VthN-high for the NMOS devices, and VthP-low and VthP-high for the PMOS devices 603, 605 the buffer delays related to a rising edge at A are as follows:

$\Delta tR_{BUF}=\Delta tR_{fast}$ if $Vth(TN0)=VthN$-low and $Vth(TP1)=VthP$-low, $\Delta tR_{BUF}=\Delta tR_{slow}$ if $Vth(TN0)=VthN$-high and $Vth(TP1)=VthP$-high.

The remaining transistors TP0 604 and TN1 604 may be configured depending on the desired relative propagation speed for a falling edge at A: a falling edge at A is propagated relatively fast to the buffer's output Z for relatively low absolute values of the threshold voltages Vth(TP0) and Vth(TN1), and relatively slow to the buffer's output Z for relatively high absolute values of the threshold voltages Vth(TP0) and Vth(TN1).

In other words, assuming two threshold voltage options VthN-low and VthN-high for the NMOS devices, and VthP-low and VthP-high for the PMOS devices, the buffer delays are:

$\Delta tF_{BUF}=\Delta tF_{fast}$ if $Vth(TP0)=VthP$-low and $Vth(TN1)=VthN$-low, $\Delta tF_{BUF}=\Delta tF_{slow}$ if $Vth(TP0)=VthP$-high and $Vth(TN1)=VthN$-high.

Figure 13:
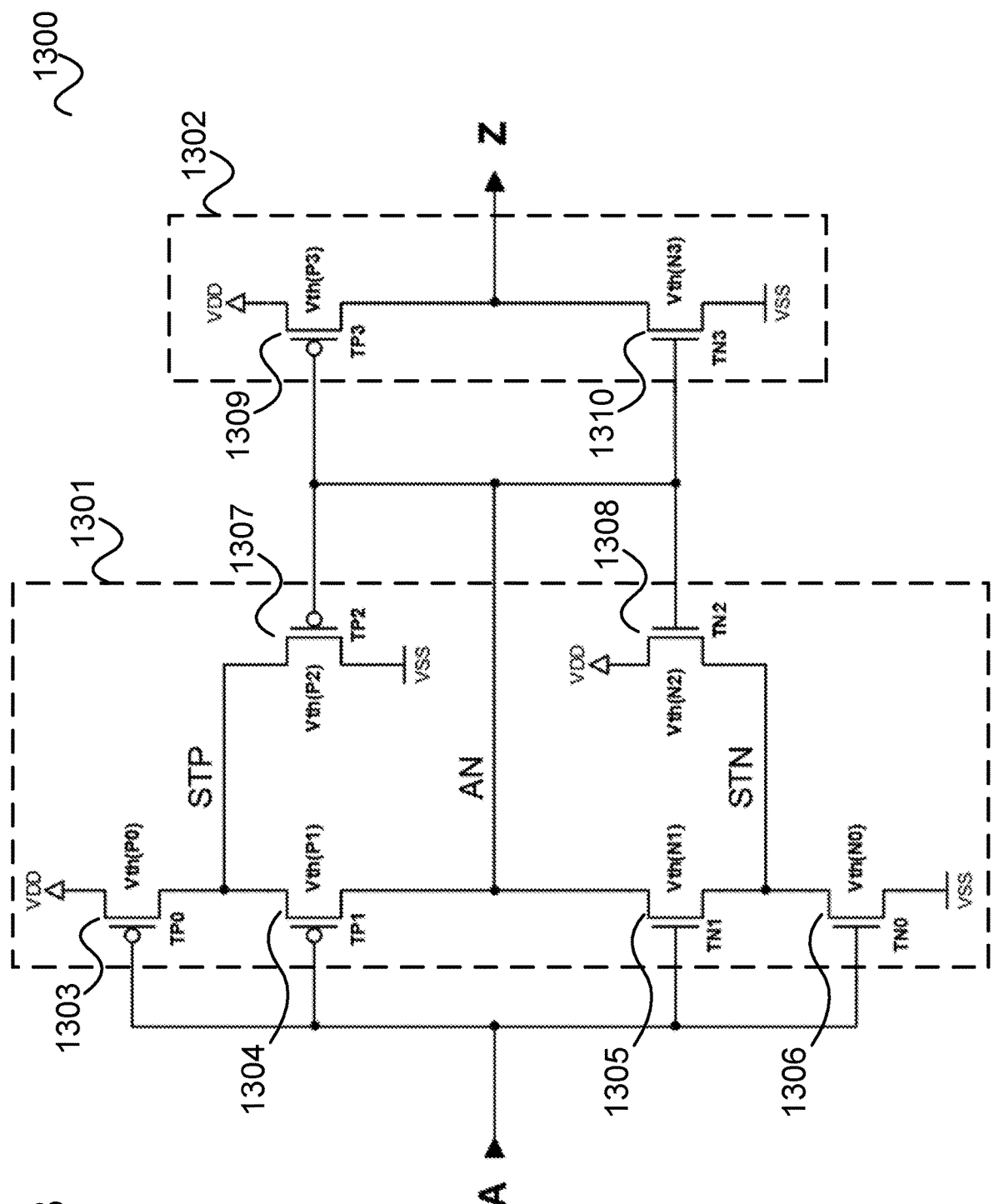
FIG. 13 shows a delay buffer according to another embodiment.

FIG. 13 shows a delay buffer 1300 according to another embodiment

The delay buffer 1300 includes a Schmitt trigger 1301 (with the Schmitt trigger property for both rising and falling edges at its input) and a serially connected inverter 1302 with the property that different threshold voltages are provided in order to get a relatively fast or a relatively slow Schmitt trigger (ST) buffer independently for rising and falling edges at the Schmitt trigger buffer's input A.

The Schmitt trigger 1301 is formed by a serial connection of a first p-channel FET TP0 1303, a second p-channel FET TP1 1304, a first n-channel FET TN1 1305 and a second n-channel FET TN0 1306 as well as a third p-channel FET TP2 1307 connected between the low supply potential (VSS) and the point of connection of the first p-channel FET TP0 1303 and the second p-channel FET TP1 1304 and a third n-channel FET TN2 1308 connected between the high supply potential (VDD) and the point of connection of the first n-channel FET TN1 1305 and the second n-channel FET TN0 1306 and whose gate is connected to the input of the inverter 1302.

The inverter 1302 is formed by serial connection of a fourth p-channel FET TP3 1309 and a fourth n-channel FET TN3 1310.

The input of the inverter is further connected to the point of connection of the second p-channel FET 1304 and the first n-channel FET 1305.

The Schmitt trigger's property related to a rising edge at input A is realized by means of the negative feedback NMOS device TN2 1308 whose gate is connected to the Schmitt trigger output AN and whose drain and source are connected to the positive supply voltage VDD and to the node STN between NMOS devices TN0 1306 and TN1 1305, respectively. Thus, before the rising edge at A (i.e. as long as A=0) the Schmitt trigger output AN is at high potential VDD, so that TN2 1308 is close to its ON state and node STN lies at approximately VDD-Vth(TN2). Then, with the rising edge at A, node STN is pulled down towards VSS, the low supply potential, so that current is drawn not only from AN through TN1 1305 but also from VDD through TN2 1308.

As a consequence, as long as V(AN)-V(STN)>Vth(TN2), NMOS TN2 1308 is in its ON state or close to it and the current through TN2 1308 realizes a negative feedback decelerating the speed with which AN is pulled towards VSS.

This negative feedback depends on Vth(TN2): the smaller Vth(TN2), the stronger the negative feedback will be and vice versa.

Hence, a rising edge at A is propagated relatively fast to the buffer's output Z for relatively low absolute values of the threshold voltages Vth(TN0), Vth(TN1) and Vth(TP3) as well as a relatively high value of the threshold voltage Vth(TN2) for the negative feedback NMOS device TN2 1308.

On the other hand, a rising edge at A is propagated relatively slow to the buffer's output Z for relatively high absolute values of the threshold voltages Vth(TN0), Vth(TN1) and
Vth(TP3) as well as a relatively low value of the threshold voltage Vth(TN2) for the negative feedback NMOS device TN2 1308.

In other words, assuming again two threshold voltage options VthN-low and VthN-high for the NMOS devices, and VthP-low and VthP-high for the PMOS devices, the buffer delays are as follows:

$\Delta tR_{BUF}=\Delta tR_{fast}$ if $Vth(TN0)=Vth(TN1)=VthN$-low,$Vth(TP3)=VthP$-low, and $Vth(TN2)=VthN$-high;

$\Delta tR_{BUF}=\Delta tR_{slow}$ if $Vth(TN0)=Vth(TN1)=VthN$-high, $Vth(TP3)=VthP$-high, and $Vth(TN2)=VthN$-low.

The Schmitt trigger's property related to a falling edge at input A is realized by means of the negative feedback PMOS device TP2 1307 whose gate is connected to the Schmitt trigger output AN and whose drain and source are connected to the low supply voltage VSS and to the node STP between PMOS devices TP0 1303 and TP1 1304, respectively. Thus, before the falling edge at A (i.e. as long as A=1) the Schmitt trigger output AN is at low potential VSS, so that TP2 is close to its ON state and node STP lies at approximately VSS+|Vth(TP2)|. Then, with the falling edge at A, node STP is pulled up towards the upper supply potential VDD, so that current flows not only to AN through TP1 1304 but also to VSS through TP2 1307.

As a consequence, as long as V(STP)−V(AN)>|Vth(TP2)|, PMOS TP2 1307 is in its ON state or close to it and the current through TP2 realizes a negative feedback decelerating the speed with which AN is pulled towards VDD. This negative feedback depends on |Vth(TP2)|: the smaller |Vth(TP2)|, the stronger the negative feedback will be and vice versa.

Hence, a falling edge at A is propagated relatively fast to the buffer's output Z for relatively low absolute values of the threshold voltages Vth(TP0), Vth(TP1) and Vth(TN3) as well as a relatively high absolute value of the threshold voltage Vth(TP2) for the negative feedback PMOS device TP2 1307.

On the other hand, a falling edge at A is propagated relatively slow to the buffer's output Z for relatively high absolute values of the threshold voltages Vth(TP0), Vth(TP1) and Vth(TN3) as well as a relatively low absolute value of the threshold voltage Vth(TP2) for the negative feedback PMOS device TP2 1307.

In other words, assuming again two threshold voltage options VthN-low and VthN-high for the NMOS devices, and VthP-low and VthP-high for the PMOS devices, the buffer delays are:

$\Delta tF_{BUF} = \Delta tF_{fast}$ if $Vth(TP0) = Vth(TP1) = VthP$-low, $Vth(TN3) = VthN$-low, and $Vth(TP2) = VthP$-high;

$\Delta tF_{BUF} = \Delta tF_{slow}$ if $Vth(TP0) = Vth(TP1) = VthP$-high, $Vth(TN3) = VthN$-high, and $Vth(TP2) = VthP$-low.

Figure 14:
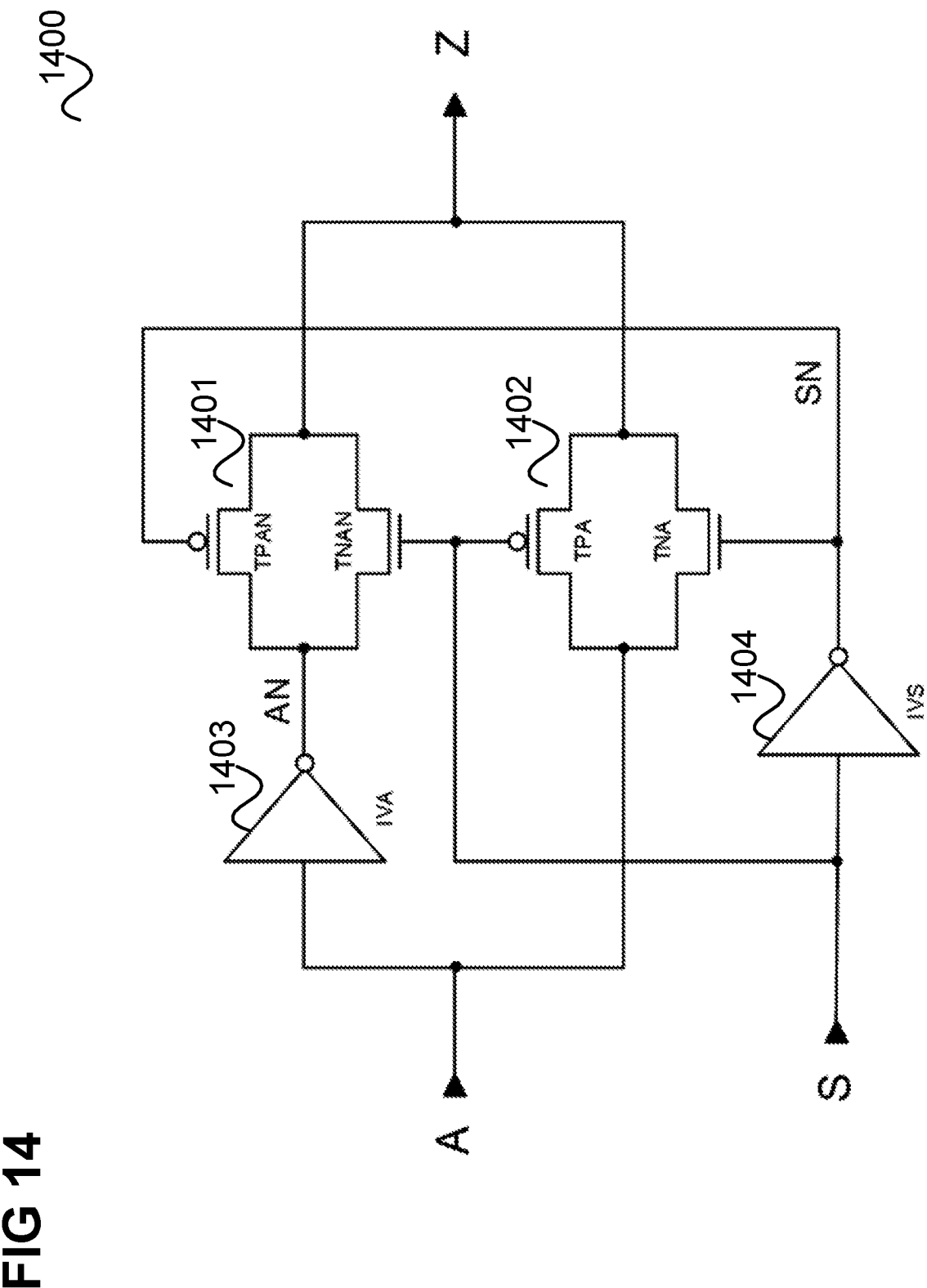
FIG. 14 shows a circuit for an exemplary implementation of an XOR gate, e.g. used for the XOR gates of the circuit of FIG. 12.

FIG. 14 shows a circuit 1400 for an exemplary implementation of an XOR gate, e.g. used for the XOR gates 1207, 1208 of the circuit 1200 of FIG. 12.

The circuit 1400 includes two transmission gates 1401, 1402 each consisting in a p-channel FET whose source and drain terminals are parallel connected to the corresponding source and drain terminals of an n-channel FET. The gate of the n channel FET of the first transmission gate 1401 is coupled to the gate of the p channel FET of the second transmission gate. The first transmission gate 1401 is supplied at its input with the inverted version AN of a first input signal A (generated by a first inverter 1403) and the second transmission gate 1402 is supplied at its input with the first input signal A. A second input signal S is supplied to the n-channel FET of the first transmission gate 1401 and to the p-channel FET of the second transmission gate 1402 and to a second inverter 1404 which generates an inverted version SN of the second input signal which is supplied to the p-channel FET gate of the first transmission gate 1401 and the n-channel FET gate of the second transmission gate. The outputs of the transmission gates 1401, 1402 are connected together to an output node providing the circuit's output signal Z.

It should be noted that all above KLG embodiments may be modified or further extended by implementing more than two dual-buffer stages. For instance, a third dual-buffer stage (plus an additional transposition stage) may be included, before or after the first one, or after the second one, where the added dual-buffer stage may include nominally identical delays. This results in higher transistor count and larger area, but also in increased obfuscation of the Boolean secret X. Another option could consist in two additional dual-buffer stages (plus additional transposition stages) including the same numbers of fast and slow delay buffers as the original ones of e.g. FIG. 5, FIG. 11 and FIG. 12. This further increases the area but also provides the option for multiple combinations of key bits enabling a valid KLG access for generation of the Boolean secret X.

Yet another option is to generalize the ICBC-X circuitry with path-dependent secrets, i.e. ICBC including more than one Boolean secret, (as illustrated in the example of FIGS. 2 and 3) in a way that e.g. only one of two Boolean secrets (or two of four Boolean secrets) is left, whereas the other one is replaced by an unpredictable value at the ICBC's output due to a now partially missing differential Vth programming. So, for example in FIG. 2, choosing a threshold voltage configuration such that X1 is stable and predictable (if one knows the threshold voltage configuration) while X0 is unpredictable.

For example, this may be achieved by choosing $Vth(TPZ1) < Vth(TPY1); Vth(TPZ0) < Vth(TPY0)$ or $Vth(TPZ1) > Vth(TPY1); Vth(TPZ0) > Vth(TPY0)$ to have predictable X1 but choosing neither $Vth(TNZ1) < Vth(TNY1); Vth(TNZ0) < Vth(TNY0)$ nor $Vth(TNZ1) > Vth(TNY1); Vth(TNZ0) > Vth(TNY0)$ such that X0 is unpredictable.

Figure 15:
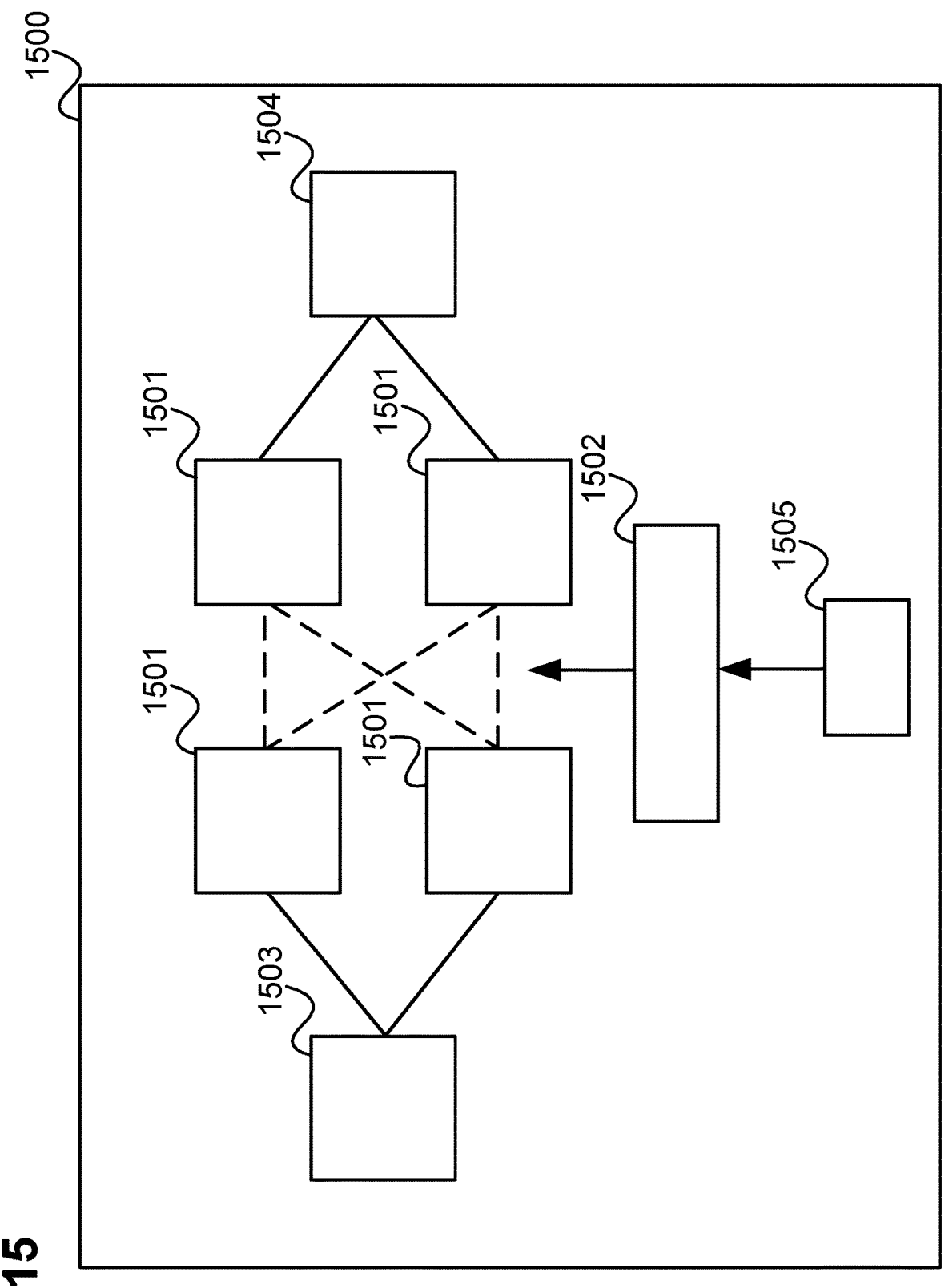
FIG. 15 shows an integrated circuit according to an embodiment.

In summary, according to various embodiments, an integrated circuit is provided as illustrated in FIG. 15.

FIG. 15 shows an integrated circuit 1500 according to an embodiment.

The integrated circuit 1500 includes a plurality of subcircuits 1501 having different signal transfer reaction times and a control circuit 1502 configured to form two competing paths from the plurality of subcircuits 1501 in response to a control signal 1505.

The integrated circuit 1500 further includes an input circuit 1503 configured to supply an input signal to the two competing paths and an output circuit 1504 configured to generate an output value depending on which of the competing paths has transferred the input signal with shorter reaction time. A transfer of the input signal may for example be an outputting of the input signal.

According to various embodiments, in other words, a circuit containing (or representing) one or more Boolean secrets is provided wherein the Boolean secrets are output depending on the formation of competing paths by parts (sub-circuits) of the circuit, e.g. delay elements or circuit branches. The formation depends on a control input which may be seen as a password (e.g. one or more bits of a binary password value) since depending on whether the control input has a correct value (i.e. a predetermined value) the competing paths are formed such that the circuit outputs a certain Boolean secret (e.g. one or more secret bits). The Boolean secret can be seen to be represented or encoded by the different signal transfer reaction times of the plurality of subcircuits. These different signal transfer reaction times may in turn arise from different (relative) threshold voltages of field effect transistors (e.g. MOS devices) forming the subcircuits (e.g. gate region dopings), e.g. which FETs have high threshold voltages and which have low threshold voltages (assuming two or more threshold voltage options for the FETs in the fabrication of the integrated circuit).

The control signal (i.e. the "password") 1505 may be a binary value (including one or more bits) provided by other parts of the integrated circuit 1500. It can be seen to unlock the (e.g. "KLG") circuitry including the subcircuits 1501, the control circuit 1502, the input circuit 1503 and the output circuit 1504 storing one or Boolean secrets to output the one or more Boolean secrets.

The transfer of a signal may be the propagation of a signal (e.g. an edge) along the respective path. The transfer of a signal may also include the charging of nodes of competing paths. For example, both competing paths are connected to competing nodes and/or one competing path charges a node to impede the other competing path such that in the end one competing path "wins", e.g. by loading a node to an associated value like described in the examples above, e.g. by setting a flip-flop to a certain value.

It should be noted that forming a competing path does not necessary mean that connections are set. It may also mean that it depends on the control signal which paths are competing. For example, different paths may compete in case of a rising edge than in case of a falling edge. The control circuit may in that case control whether a rising edge or a falling edge is supplied to the integrated circuit (it may for example provide the input circuit with the input signal to be fed to the competing paths). In particular, the control circuit may control the input circuit (to form the competing paths).

The output values (i.e. the Boolean secrets) that are output, e.g. by a plurality of circuits illustrated in FIG. 15, may be used by another circuit component to form a binary value (e.g. a key) which may be used by a processing circuit (which may be part of the integrated circuit) to process data (e.g. decrypt data, verify a signature, key generation etc.).

Figure 16:
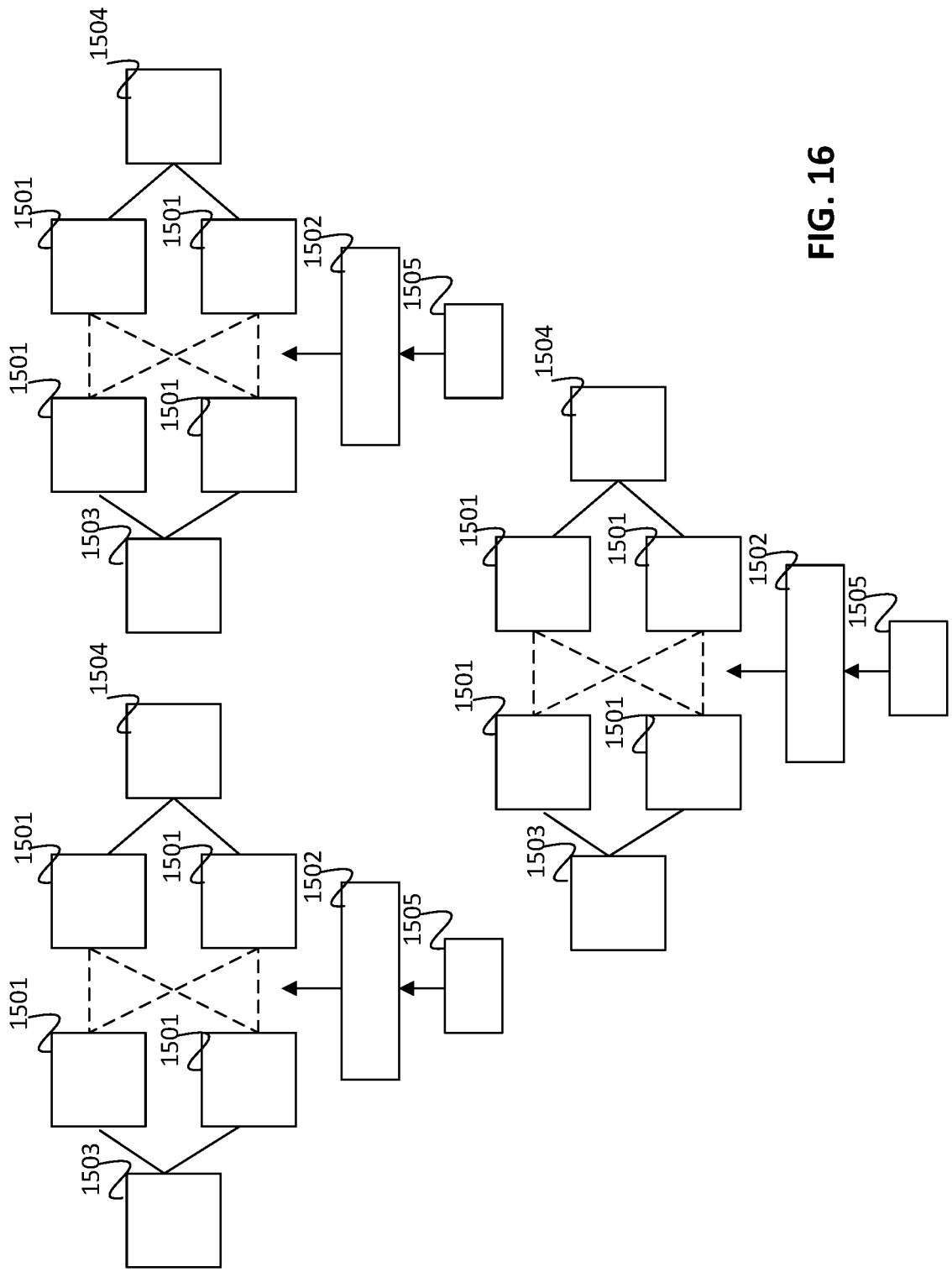
FIG. 16 shows an integrated circuit comprising a multiplicity of cells.

FIG. 16 shows an integrated circuit comprising a multiplicity of cells, each cell comprising a plurality of subcircuits 1501 having different signal transfer reaction time; a control circuit 1502 configured to form two competing paths from the plurality of subcircuits in response to a control signal; an input circuit 1503 configured to supply an input signal to the two competing paths; and an output circuit 1504 configured to generate an output value depending on which of the competing paths has transferred the input signal with shorter reaction time.

Various Examples are described in the following:

Example 1 is an integrated circuit as illustrated in FIG. 15.

Example 2 is the integrated circuit of Example 1, wherein the plurality of subcircuits are delay buffers.

Example 3 is the integrated circuit of Example 1 or 2, wherein the control circuit includes one or more multiplexers controlled at least by the control signal.

Example 4 is the integrated circuit of any one of Examples 1 to 3, wherein the output circuit is an RS flip-flop whose reset input is supplied with an output of one of the competing paths and whose set input is supplied with an output of the other of the competing paths.

Example 5 is the integrated circuit of any one of Examples 1 to 4, wherein each subcircuit of the plurality of subcircuits includes a plurality of field effect transistors and the subcircuits differ in predetermined and predictable threshold voltages of at least some of the field effect transistors.

Example 6 is the integrated circuit of any one of Examples 1 to 5, wherein each subcircuit of the plurality of subcircuits includes a plurality of field effect transistors, wherein the threshold voltages of corresponding transistors exhibit predetermined and predictable differences between the subcircuits for one or more of the field effect transistors.

Example 7 is the integrated circuit of Example 5 or 6, wherein each subcircuit of the plurality of subcircuits has the same number and types of field effect transistors connected in the same manner.

Example 8 is the integrated circuit of any one of Examples 1 to 7, wherein the control circuit is configured to form the two competing paths by serially connecting circuits of the plurality of subcircuits such that each competing path has an aggregate signal transfer reaction time given by the circuits connected to form the competing path.

Example 9 is the integrated circuit of any one of Examples 1 to 8, wherein the control circuit is configured to form, depending on the control signal, the two competing paths such that the signal transfer reaction times of the two competing paths exhibit predetermined and predictable differences or such that the overall signal transfer reaction times of the two paths exhibit undetermined and unpredictable differences.

Example 10 is the integrated circuit of any one of Examples 1 to 9, wherein the input signal includes a logic state transition.

Example 11 is the integrated circuit of any one of Examples 1 to 10, wherein the control signal includes a binary value.

Example 12 is the integrated circuit of any one of Examples 1 to 11, wherein the plurality of subcircuits form predetermined competing paths and the control circuit is configured to form the two competing paths by selecting two competing paths from the predetermined competing paths.

Example 13 is the integrated circuit of any one of Examples 1 to 12, wherein the integrated circuit includes a multiplicity of cells, each cell including a plurality of subcircuits having different signal transfer reaction time; a control circuit configured to form two competing paths from the plurality of subcircuits in response to a control signal; an input circuit configured to supply an input signal to the two competing paths and an output circuit configured to generate an output value depending on which of the competing paths has transferred the input signal with shorter reaction time.

Example 14 is the integrated circuit of any Example 13, including a key generation circuit configured to form a cryptographic key from the output values.

Example 15 is the integrated circuit of Example 13 or 14, further including a processing circuit configured to process data using a binary value formed of the output values.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

100 Chip card
101 Chip card carrier
102 Chip card module
103 Memory
104 Processor
105 Crypto processor
200 Circuit
201, 202 AND-NOR gates
203, 204 Inverters
205-207 p-channel FETs
208 Output node
209-211 n-channel FETs
212-214 p-channel FETs
215 Output node
216-218 n-channel FETs
300 Circuit
301, 302 AND-NOR gates
303, 304 Inverters
400 Key-lock gate
500 Circuit
501-504 Delay buffers
505, 506 Multiplexers
507, 508 NAND gates
509 Inverter
600 Delay buffer
601, 602 Inverters
603 p-channel FET
604 n-channel FET
605 p-channel FET
606 n-channel FET
700 Delay buffer
701 Schmitt trigger
702 Inverter
703 p-channel FET
704-706 n-channel FETs
707 p-channel FET
708 n-channel FET
800 Circuit
801-804 Transmission gates
805 Inverter
900 Circuit 901, 902 Circuit stages
903, 904 Inverters
1000 Circuit
1001, 1002 Complex gates
1003 NAND gate
1100 Circuit
1101 Transposition stage
1102 Delay buffer stage
1103 Output stage
1104, 1105 Multiplexers
1106 NAND gate
1200 Circuit
1201-1204 Delay buffers
1205 Transposition stage
1206 XOR stage
1207, 1208 XOR gates
1209, 1210 NAND gates
1300 Delay buffer
1301 Schmitt trigger
1302 Inverter
1303, 1304 p-channel FETs
1305, 1306 n-channel FETs
1307 p-channel FET
1308 n-channel FET
1309 p-channel FET
1310 n-channel FET
1400 Circuit
1401, 1402 Transmission gates
1403, 1404 Inverter
1500 Integrated circuit

What is claimed is:

1. An integrated circuit comprising:
a plurality of subcircuits having different signal transfer reaction times;
a control circuit configured to form two competing paths from the plurality of subcircuits in response to a control signal;
an input circuit configured to supply an input signal to the two competing paths; and
an output circuit configured to generate an output value depending on which of the competing paths has transferred the input signal with shorter reaction time.

2. The integrated circuit of claim 1, wherein the plurality of subcircuits are delay buffers.

3. The integrated circuit of claim 1, wherein the control circuit comprises one or more multiplexers controlled at least by the control signal.

4. The integrated circuit of claim 1, wherein the output circuit is an RS flip-flop whose reset input is supplied with an output of one of the competing paths and whose set input is supplied with an output of the other of the competing paths.

5. The integrated circuit of claim 1, wherein each subcircuit of the plurality of subcircuits comprises a plurality of field effect transistors and the subcircuits differ in predetermined and predictable threshold voltages of at least some of the field effect transistors.

6. The integrated circuit of claim 1, wherein each subcircuit of the plurality of subcircuits comprises a plurality of field effect transistors, wherein the threshold voltages of corresponding transistors exhibit predetermined and predictable differences between the subcircuits for one or more of the field effect transistors.

7. The integrated circuit of claim 5, wherein each subcircuit of the plurality of subcircuits has the same number and types of field effect transistors connected in the same manner.

8. The integrated circuit of claim 1, wherein the control circuit is configured to form the two competing paths by serially connecting circuits of the plurality of subcircuits such that each competing path has an aggregate signal transfer reaction time given by the circuits connected to form the competing path.

9. The integrated circuit of claim 1, wherein the control circuit is configured to form, depending on the control signal, the two competing paths such that the signal transfer reaction times of the two competing paths exhibit predetermined and predictable differences or such that the overall signal transfer reaction times of the two paths exhibit undetermined and unpredictable differences.

10. The integrated circuit of claim 1, wherein the input signal comprises a logic state transition.

11. The integrated circuit of claim 1, wherein the control signal comprises a binary value.

12. The integrated circuit of claim 1, wherein the plurality of subcircuits form predetermined competing paths and the control circuit is configured to form the two competing paths by selecting two competing paths from the predetermined competing paths.

13. An integrated circuit, wherein the integrated circuit comprises a multiplicity of cells, each cell comprising
a plurality of subcircuits having different signal transfer reaction time;
a control circuit configured to form two competing paths from the plurality of subcircuits in response to a control signal;
an input circuit configured to supply an input signal to the two competing paths; and
an output circuit configured to generate an output value depending on which of the competing paths has transferred the input signal with shorter reaction time.

14. The integrated circuit of claim 13, comprising a key generation circuit configured to form a cryptographic key from the output values.

15. The integrated circuit of claim 13, further comprising a processing circuit configured to process data using a binary value formed of the output values.

* * * * *